United States Patent
Wu

(10) Patent No.: US 8,514,967 B2
(45) Date of Patent: Aug. 20, 2013

(54) SENDING APPARATUS, RECEIVING APPARATUS, SENDING METHOD, AND RECEIVING METHOD

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 13/031,727

(22) Filed: Feb. 22, 2011

(65) Prior Publication Data

US 2011/0142143 A1    Jun. 16, 2011

Related U.S. Application Data

(63) Continuation of application No. PCT/JP2008/066594, filed on Sep. 12, 2008.

(51) Int. Cl.
*H04L 27/00* (2006.01)

(52) U.S. Cl.
USPC .................... 375/286; 375/260; 375/261

(58) Field of Classification Search
USPC ............ 375/260, 286, 261, 295, 298, 316; 370/328, 332
See application file for complete search history.

(56) References Cited

U.S. PATENT DOCUMENTS

| 8,116,412 | B1* | 2/2012 | Jia et al. ...................... 375/343 |
| 2006/0013168 | A1* | 1/2006 | Agrawal et al. ............... 370/335 |
| 2006/0068724 | A1 | 3/2006 | Matsumoto et al. |
| 2007/0054624 | A1* | 3/2007 | Kashiwagi ................. 455/67.13 |
| 2008/0247470 | A1* | 10/2008 | Wang et al. ................... 375/241 |
| 2009/0042511 | A1* | 2/2009 | Malladi ......................... 455/62 |
| 2009/0052394 | A1* | 2/2009 | Kalhan ......................... 370/331 |
| 2009/0220034 | A1* | 9/2009 | Ramprashad et al. ........ 375/341 |

FOREIGN PATENT DOCUMENTS

| EP | 1681820 A1 | 7/2006 |
| JP | 2002199037 | 7/2002 |
| JP | 2003244257 | 8/2003 |
| JP | 2003333115 | 11/2003 |
| JP | 2005102073 | 4/2005 |
| JP | 2005142923 | 6/2005 |
| JP | 2005159577 | 6/2005 |
| JP | 2006261982 | 9/2006 |
| WO | 2010001475 A1 | 1/2010 |

OTHER PUBLICATIONS

Md. Jahangir Hossain, Mohamed-Slim Alouini and Vijay K. Bhargava, "Rate Adaptive Hierarchical Modulation-Assisted Two-User Opportunistic Scheduling", University of British Columbia and Texas A&M University, Jun. 2007.*

(Continued)

*Primary Examiner* — Aristocratis Fotakis
(74) *Attorney, Agent, or Firm* — Smith, Gambrell & Russell, LLP

(57) ABSTRACT

In a sending apparatus, a storage section stores information which associates a first communication quality and a second communication quality with hierarchical modulation methods each using a plurality of channels. On the basis of the information stored in the storage section, a control section selects a hierarchical modulation method corresponding to the first communication quality which is a communication quality for a receiving apparatus and the second communication quality which is a communication quality for a receiving apparatus. A sending section maps data a destination of which is the receiving apparatus and data a destination of which is the receiving apparatus to the plurality of channels according to the hierarchical modulation method selected, and transmits the data.

13 Claims, 27 Drawing Sheets

(56) References Cited

OTHER PUBLICATIONS

Dong In Kim, "Two-Best User Scheduling for High-Speed Downlink Multicode CDMA with Code Constraint", Simon Fraser University, 2004, IEEE.*

Américo M.C.Correia, João C.M.Silva, Nuno M.B Souto, Luísa A.C. Silva, Alexandra B.Boal, and Armando B.Soares, "Multi-Resolution Broadcast/Multicast Systems for MBMS", Instituto de Telecomunicacoes, Lisboa, IEEE, Mar. 2007.*

M.Morimoto, M. Okada, and S. Komaki, "A hierarchical Image Transmission System in a Fading Channel", in Proc. IEEE Int. Conf. Univeral Personal Commun. (ICUPC'95), pp. 769-772 dated Oct. 1995.

S. Pietrzyk, and G.J.M.Janssen, "Subcarrier and power allocation for QoS-aware OFDMA Systems Using Embedded Modulation", in Proc.Int. Conf. Commun. (ICC). Vo. 6, pp. 3202-3206 dated Jun. 20-24, 2004.

P.K. Vitthaladevuni, and M-S. Alouini, "A recursive algorithm for the exact BER computation of genralized hierarchical QAM constellation", IEEE Trans. On Information Theory, vol. 49, No. 1, pp. 297-307 dated Jan. 2003.

K.Ramchandran, A. Orteg, K.M. Uz, and M.Vetterli, "Multiresolution broadcast for digital HDTV using joint source/channel coding", IEEE J. Sel. Areas Commun., vol. 11, No. 1, pp. 6-22 dated Jan. 1993.

M.B. Pursley and J.M.Shea, "Adaptive nonuniform phase-shift-key modulation for multimedia traffic in wireless networks" IEEE J.Sel. Areas Commun., vol. 18, No. 8, pp. 1394-1407 dated Aug. 2000.

D.I. Kim, "Two-best user scheduling for high-speed downlink multicode CDMA with code constraint", in Proc. IEEE Conf. Global Commun. (Globecomm), pp. 2659-2663 dated Nov. 29-Dec. 3, 2004.

M.J. Hossain, M-S. Alouini, and V.K. Bhargave, "Rate adaptive hierarchical modulation-assisted two-user opportunistic scheduling", IEEE Trans. On Wireless Commun. vol. 6, No. 6, pp. 2076-2085 dated Jun. 2007.

A. Chindapol, and J. Ritcey, "Bit-interleaved coded modulation with signal space diversity in Rayleigh fading", in Proc. IEEE Conf. Signals, System and Computer, Conference, vol. 2, pp. 1003-1007 dated Oct. 24-27, 1999.

International Search Report dated Oct. 21, 2008, in corresponding International application No. PCT/JP2008/066594.

Japanese Patent Office Action issued on Jan. 29, 2013 in Japanese Patent Application No. 2010-528579.

* cited by examiner

QPSK×2    321

| | UE0 (LOW QUALITY) | UE1 (HIGH QUALITY) |
|---|---|---|
| 1 | I0+Q0 | I1+Q1 |
| 2 | I0+Q1 | I1+Q0 |
| 3 | I0+I1 | Q0+Q1 |

16QAM×2    322

| | UE0 (LOW QUALITY) | UE1 (HIGH QUALITY) |
|---|---|---|
| 1 | MSB0+LSB0 | MSB1+LSB1 |
| 2 | MSB0+MSB1 | LSB0+LSB1 |
| 3 | MSB0+LSB1 | MSB1+LSB0 |
| 4 | MSB0+MSB1+LSB0 | LSB1 |
| 5 | MSB0+LSB0+LSB1 | MSB1 |

FIG. 10

64QAM×2                              323

|   | UE0 (LOW QUALITY) | UE1 (HIGH QUALITY) |
|---|---|---|
| 1 | MSB0+SB0+LSB0 | MSB1+SB1+LSB1 |
| 2 | MSB0+MSB1 | SB0+SB1+LSB0+LSB1 |
| 3 | MSB0+MSB1+SB0 | SB1+LSB0+LSB1 |
| 4 | MSB0+MSB1+LSB1 | SB0+SB1+LSB0 |
| 5 | MSB0+SB1+LSB1 | MSB1+SB0+LSB0 |
| 6 | MSB0+MSB1+SB0+SB1 | LSB0+LSB1 |
| 7 | MSB0+MSB1+LSB0+LSB1 | SB0+SB1 |

16QAM+64QAM                          324

|   | UE0 (LOW QUALITY) | UE1 (HIGH QUALITY) |
|---|---|---|
| 1 | MSB0+LSB0 | MSB1+SB1+LSB1 |
| 2 | MSB0+LSB0+MSB1 | SB1+LSB1 |
| 3 | MSB0+MSB1+SB1 | LSB0+LSB1 |
| 4 | MSB0+MSB1+LSB1 | LSB0+SB1 |
| 5 | MSB0+SB1+LSB0 | MSB1+LSB1 |
| 6 | MSB0+LSB0+LSB1 | MSB1+SB1 |
| 7 | MSB0+SB1+LSB1 | MSB1+LSB0 |

FIG. 11

| Channel Type | UE0 (LOW QUALITY) | UE1 (HIGH QUALITY) |
|---|---|---|
| 0 | QPSK | QPSK |
| 1 | MSB0+LSB0 (16QAM) | MSB1+LSB1 (16QAM) |
| 2 | MSB0+SB0+LSB0 (64QAM) | MSB1+SB1+LSB1 (64QAM) |
| 3 | QPSK | MSB1+LSB1 (16QAM) |
| 4 | MSB0+MSB1 (16QAM) | LSB0+LSB1 (16QAM) |
| 5 | MSB0+MSB1 (64QAM) | SB0+SB1+LSB0+LSB1 (64QAM) |
| 6 | MSB0+MSB1+SB0 (64QAM) | SB1+LSB0+LSB1 (64QAM) |
| 7 | MSB0+MSB1+LSB0 (64QAM) | SB0+SB1+LSB1 (64QAM) |

| H-CH Type | MCS Indicator (UE0) | MCS Indicator (UE1) |

FIG. 23

SENDING APPARATUS, RECEIVING APPARATUS, SENDING METHOD, AND RECEIVING METHOD

This application is a continuing application, filed under 35 U.S.C. §111(a), of International Application PCT/JP2008/066594, filed on Sep. 12, 2008.

FIELD

The embodiments discussed herein are related to a sending apparatus, a receiving apparatus, a sending method, and a receiving method.

BACKGROUND

At present radio communication systems such as portable telephone systems and radio LANs (Local Area Networks) are widely used. With radio communication a sending apparatus modulates data and outputs it as a transmitted signal. A receiving apparatus demodulates the received signal and reconstructs the data. There are various modulation methods and one of them is multilevel modulation. With the multilevel modulation the amplitude and phase of a signal is controlled. By doing so, a plurality of information bits can be mapped to a unit signal interval (symbol). With 16QAM (Quadrature Amplitude Modulation), for example, 4 bits can be mapped to one symbol. With 64 QAM 6 bits can be mapped to one symbol.

With the multilevel modulation there are cases where the aptness of an error to occur depends on the position of a bit mapped to a symbol. With 16 QAM, for example, it is assumed that 2 higher-order bits are assigned for identifying first through fourth quadrants on an I-Q plane and that 2 lower-order bits are assigned for identifying 4 points in each quadrant. As a result, the difference in amplitude or phase between symbols which differ in 2 higher-order bits is comparatively large and an error is unapt to occur. On the other hand, the difference in amplitude or phase between symbols which are equal in 2 higher-order bits and which are different only in 2 lower-order bits is comparatively small and an error is apt to occur. That is to say, the aptness of an error to occur differs between the 2 higher-order bits and the 2 lower-order bits.

Hierarchical modulation is known as a technique using this property of the multilevel modulation. With the hierarchical modulation plural kinds of information bits can be mingled and mapped to a symbol. For example, if image data is transmitted, a method for mapping an information bit indicative of data, such as low resolution data, which is greatly influenced at the time of being reproduced to a position where an error is unapt to occur and mapping an information bit indicative of data, such as high resolution data, which is slightly influenced at the time of being reproduced to a position where an error is apt to occur is known (see, for example, M. Morimoto, M. Okada, and S. Komaki, "A Hierarchical Image Transmission System in a Fading Channel", Proc. IEEE International Conference on Universal Personal Communications (ICUPC '95), pp. 769-772, 1995; S. Pietrzyk, and G. J. M. Janssen, "Subcarrier and Power Allocation for QoS-aware OFDMA System Using Embedded Modulation", Proc. IEEE International Conference on Communications (ICC 2004), Vol. 6, pp. 3202-3206, 2004; P. K. Vitthaladevuni, and M-S. Alouini, "A Recursive Algorithm for the Exact BER Computation of Generalized Hierarchical QAM Constellation", IEEE Transactions on Information Theory, Vol. 49, No. 1, pp. 297-307, 2003; K. Ramchandran, A. Orteg, K. M. Uz, and M. Vetterli, "Multiresolution Broadcast for Digital HDTV Using Joint Source/Channel Coding", IEEE Journal on Selected Areas in Communications, Vol. 11, No. 1, pp. 6-22, 1993; M. B. Pursley, and J. M. Shea, "Adaptive Nonuniform Phase-Shift-Key Modulation for Multimedia Traffic in Wireless Networks", IEEE Journal on Selected Areas in Communications, Vol. 18, No. 8, pp. 1394-1407, 2000; D. I. Kim, "Two-Best User Scheduling for High-Speed Downlink Multicode CDMA with Code Constraint", Proc. IEEE Global Telecommunications Conference (Globecom 2004), pp. 2659-2663, 2004; M. J. Hossain, M-S. Alouini, and V. K. Bhargava, "Rate Adaptive Hierarchical Modulation-Assisted Two-User Opportunistic Scheduling", IEEE Transactions on Wireless Communications, Vol. 6, No. 6, pp. 2076-2085, 2007; and A. Chindapol, and J. Ritcey, "Bit-Interleaved Coded Modulation with Signal Space Diversity in Rayleigh Fading", Proc. IEEE Asilomar Conference on Signals, Systems and Computers, (ACSSC 1999) Vol. 2, pp. 1003-1007, 1999.

By the way, it is assumed that, in a communication system in which a sending apparatus transmits data to a plurality of receiving apparatus, the data the destinations of which are the plurality of receiving apparatus is hierarchically modulated. However, if the hierarchical modulation is adopted, there are various choices such as which multilevel modulation method (16QAM or 64QAM, for example) is used for each channel, which bit is assigned to data the destination of which is each receiving apparatus, and the like. Accordingly, there are problems about how to select a proper hierarchical modulation method.

SUMMARY

According to an aspect of the invention, A sending apparatus for transmitting data to a plurality of receiving apparatus, the sending apparatus includes a storage section which stores information that associates a first communication quality and a second communication quality with hierarchical modulation methods each using a plurality of channels, a control section which selects a hierarchical modulation method corresponding to the first communication quality that is a communication quality for a first receiving apparatus and the second communication quality that is a communication quality for a second receiving apparatus, and a sending section which maps, according to the hierarchical modulation method selected by the control section, data a destination of which is the first receiving apparatus and data a destination of which is the second receiving apparatus to the plurality of channels, and transmits the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates a first example of a hierarchically modulated channel definition table;

FIG. 11 illustrates a second example of a hierarchically modulated channel definition table;

FIG. 15 illustrates a first example of a channel type definition table;

FIG. 23 illustrates a first example of control information for giving notice of a MCS identification number;

DESCRIPTION OF EMBODIMENTS

Embodiments of the present invention will now be described in detail with reference to the accompanying drawings.

Figure 1:
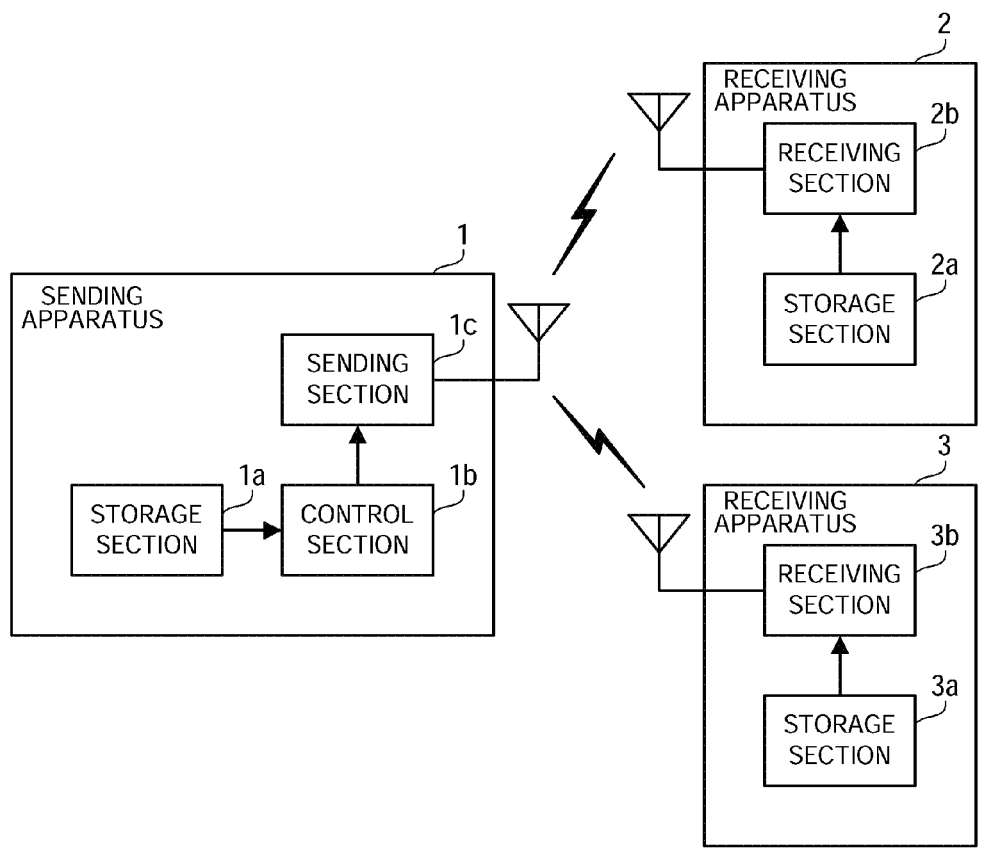
FIG. 1 illustrates a sending apparatus and receiving apparatus.

FIG. 1 illustrates a sending apparatus and receiving apparatus. A sending apparatus 1 communicates with receiving apparatus 2 and 3. The sending apparatus 1 can transmit data the destination of which is the receiving apparatus 2 and data the destination of which is the receiving apparatus 3. In the case of a mobile communication system, for example, the sending apparatus 1 can be considered as a base station and the receiving apparatus 2 and 3 can be considered as mobile stations.

The sending apparatus 1 includes a storage section 1a, a control section 1b, and a sending section 1c. The storage section 1a stores information which associates a first communication quality and a second communication quality with hierarchical modulation methods each using a plurality of channels. The control section 1b acquires communication qualities for the receiving apparatus 2 and 3. On the basis of the information stored in the storage section 1a, the control section 1b then selects a hierarchical modulation method associated with the two communication qualities. According to the hierarchical modulation method selected by the control section 1b, the sending section 1c uses a plurality of channels for hierarchically modulating data the destination of which is the receiving apparatus 2 and data the destination of which is the receiving apparatus 3 and transmitting them.

A multilevel modulation method, for example, applied to each of the plurality of channels as a hierarchical modulation method, which positions information bits indicative of the data the destination of which is the receiving apparatus 2 and the data the destination of which is the receiving apparatus 3 are mapped to, and the like are defined by the information stored in the storage section 1a. The information stored in the storage section 1a can be represented as a multidimensional data structure. If the information stored in the storage section 1a can be represented as a two-dimensional data structure, then a hierarchical modulation method applied can be specified uniquely from the communication qualities for the receiving apparatus 2 and 3. However, the number of dimensions of the data structure of the information stored in the storage section 1a may be three or more. In this case, a hierarchical modulation method applied can be specified uniquely from communication qualities for three or more receiving apparatus.

In addition to the hierarchical modulation method, a coding rate applied to the data the destination of which is the receiving apparatus 2 and a coding rate applied to the data the destination of which is the receiving apparatus 3 may be defined by the information stored in the storage section 1a. In this case, the control section 1b selects coding rates corresponding to the two communication qualities and the sending section 1c can perform coding at the selected coding rates. Furthermore, the sending section 1c can transmit control information for giving the receiving apparatus 2 and 3 notice of the hierarchical modulation method and the coding rates applied. To transmit information for uniquely identifying a hierarchical modulation method and information for uniquely identifying a coding rate in each hierarchical modulation method, to transmit information for uniquely identifying a combination of a hierarchical modulation method and a coding rate, or the like is considered as a method for giving notice of a hierarchical modulation method and a coding rate.

Communication qualities for a link from the sending apparatus 1 to the receiving apparatus 2 and for a link from the sending apparatus 1 to the receiving apparatus 3 may be used as the communication qualities for the receiving apparatus 2 and 3. For example, the control section 1b can specify the communication qualities for the receiving apparatus 2 and 3 by acquiring feedback information indicative of the communication quality from the receiving apparatus 2 and 3.

The receiving apparatus 2 includes a storage section 2a and a receiving section 2b. The storage section 2a stores the same information that is stored in the storage section 1a of the sending apparatus 1. That is to say, the storage section 2a stores information which associates the first communication quality and the second communication quality with the hierarchical modulation methods each using the plurality of channels. The receiving section 2b receives the plurality of channels to which the data the destination of which is the receiving apparatus 2 and the data the destination of which is the receiving apparatus 3 are mapped from the sending apparatus 1 and extracts the data the destination of which is the receiving apparatus 2.

At this time a hierarchical modulation method applied to the plurality of channels received may be specified on the basis of control information received from the sending apparatus 1 and the information stored in the storage section 2a. For example, the receiving section 2b acquires control information including identification information corresponding to the communication quality for the receiving apparatus 2 and identification information corresponding to the communication quality for the receiving apparatus 3, which is another apparatus, and specifies a hierarchical modulation method corresponding to these two pieces of identification information. The receiving apparatus 3 also includes a storage section 3a and a receiving section 3b corresponding to the storage section 2a and the receiving section 2b, respectively, of the receiving apparatus 2.

With the above sending apparatus 1 the control section 1b selects a hierarchical modulation method corresponding to the first communication quality which is a communication quality for the receiving apparatus 2 and the second communication quality which is a communication quality for the receiving apparatus 3 on the basis of the information stored in the storage section 1a. According to the hierarchical modulation method selected, the sending section 1c then maps the data the destination of which is the receiving apparatus 2 and the data the destination of which is the receiving apparatus 3 to the plurality of channels and transmits them. The data the destination of which is the receiving apparatus 2 and the data the destination of which is the receiving apparatus 3 mapped to the plurality of channels are extracted by the receiving apparatus 2 and 3 according to the hierarchical modulation method applied.

As a result, a proper hierarchical modulation method can be selected according to a combination of communication qualities for the receiving apparatus 2 and 3. Accordingly, data the destination of which is the receiving apparatus 2 and data the destination of which is the receiving apparatus 3 can be transmitted more efficiently.

A mobile communication system in which the function of the above sending apparatus is applied to a base station and in which the function of the above receiving apparatus is applied to a mobile station will now be described in further detail. However, the functions of the above sending apparatus and receiving apparatus can also be applied to other kinds of communication systems such as a fixed radio communication system. The function of the above sending apparatus can be applied not only to a base station but also to other kinds of communication apparatus. The function of the above receiving apparatus can be applied not only to a mobile station but also to other kinds of communication apparatus.

Figure 2:
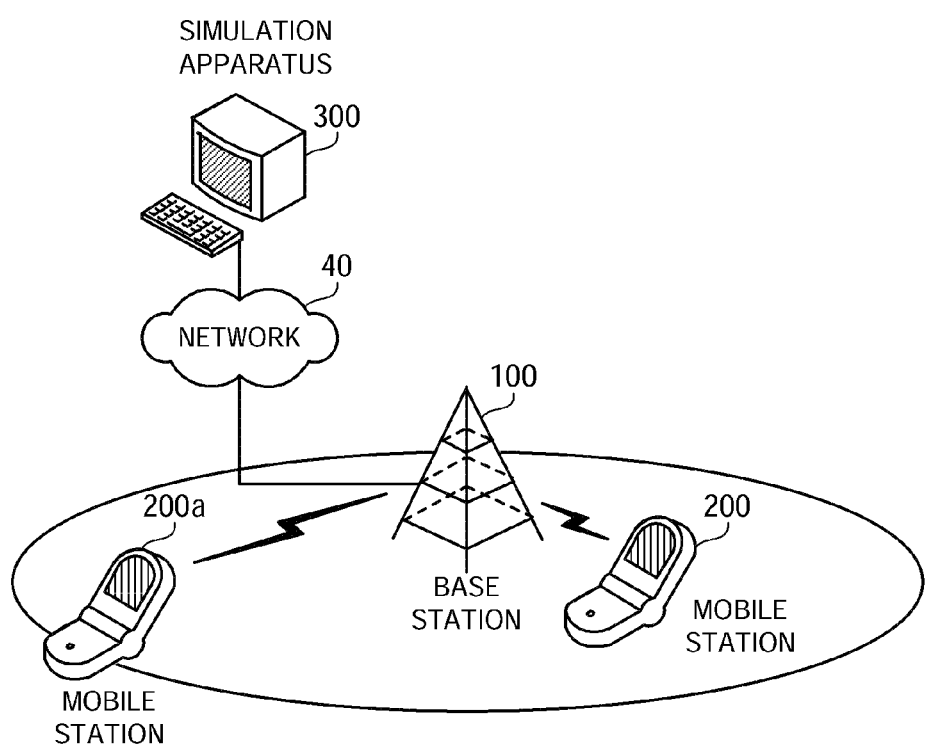
FIG. 2 illustrates the structure of a mobile communication system.

FIG. 2 illustrates the structure of a mobile communication system. A mobile communication system according to this embodiment includes a base station 100, mobile stations 200 and 200a, and a simulation apparatus 300. It is assumed that the mobile stations 200 and 200a are within a cell of the base station 100.

The base station 100 is a communication apparatus which can radio-communicate with the mobile stations 200 and 200a. The base station 100 has an adaptive modulation and coding function. The base station 100 acquires feedback information indicative of a communication quality for a down link (radio link from the base station 100 to the mobile station 200 or 200a) from the mobile station 200 or 200a and properly determines a MCS (Modulation and Coding Scheme) used for downlink communication according to the communication quality for the down link. A modulation method which the base station 100 can apply may be a hierarchical modulation method.

Each of the mobile stations 200 and 200a is a communication terminal unit which can radio-communicate with the base station 100. For example, a portable telephone can be used as each of the mobile stations 200 and 200a. The mobile station 200 or 200a demodulates and decodes data the destination of which is the mobile station 200 or 200a according to the MCS used by the base station 100. The MCS can be determined on the basis of control information included in a received signal. In addition, the mobile station 200 or 200a measures the communication quality for the down link on the basis of a signal received from the base station 100, and feeds back information indicative of the communication quality to the base station 100.

The simulation apparatus 300 can construct a MCS table which indicates the correspondence between a communication quality and a MCS. For example, a general-purpose computer can be used as the simulation apparatus 300. The simulation apparatus 300 simulates radio communication and finds an optimum MCS under each communication quality. In particular, the simulation apparatus 300 can construct a hierarchical MCS table including the hierarchical modulation method as a modulation method.

A hierarchical MCS table constructed by the simulation apparatus 300 is installed on the base station 100 and the mobile stations 200 and 200a. The hierarchical MCS table may statically be stored in the base station 100. Alternatively, the hierarchical MCS table received by the base station 100 from the simulation apparatus 300 via a network 40 may be held in the base station 100. In addition, the hierarchical MCS table may statically be stored in the mobile stations 200 and 200a. Alternatively, the hierarchical MCS table received by the mobile stations 200 and 200a from the base station 100 may be held in the mobile stations 200 and 200a.

The mobile communication system illustrated in FIG. 2 includes the two mobile stations. However, the base station 100 can communicate with three or more mobile stations. Furthermore, in this embodiment it is assumed that the mobile station 200 is nearer the base station 100 than the mobile station 200a and that receiving quality for the mobile station 200 is better than receiving quality for the mobile station 200a. This embodiment will now be described with attention paid especially to downlink communication control.

Figure 3:
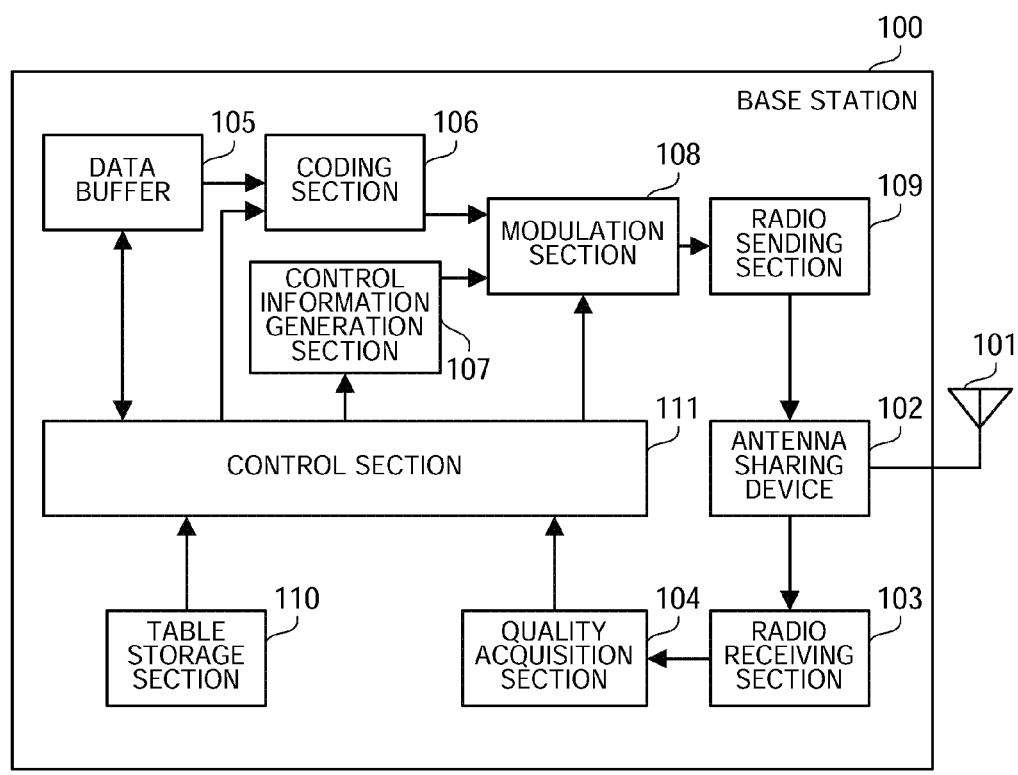
FIG. 3 is a block diagram of a base station.

FIG. 3 is a block diagram of the base station. The base station 100 includes an antenna 101, an antenna sharing device 102, a radio receiving section 103, a quality acquisition section 104, a data buffer 105, a coding section 106, a control information generation section 107, a modulation section 108, a radio sending section 109, a table storage section 110, and a control section 111.

The antenna 101 is used both for sending and for receiving. The antenna 101 outputs a radio signal received from the mobile station 200 or 200a to the antenna sharing device 102. In addition, the antenna 101 radio-outputs a transmitted signal acquired from the antenna sharing device 102. However, a sending antenna and a receiving antenna which are separate from each other may be used.

The antenna sharing device 102 separates a received signal and a transmitted signal for using the antenna 101 both for sending and for receiving. The antenna sharing device 102 outputs the received signal acquired from the antenna 101 to the radio receiving section 103. In addition, the antenna sharing device 102 makes the antenna 101 radio-output the transmitted signal acquired from the radio sending section 109. The antenna sharing device 102 includes, for example, a BPF (Band Pass Filter) for separating the received signal and the transmitted signal.

The radio receiving section 103 performs a determined radio receiving process on the received signal acquired from the antenna sharing device 102 to convert it. In order to perform this conversion process, the radio receiving section 103 includes a LNA (Low Noise Amplifier), a frequency converter, a BPF, an A/D (Analog-to-Digital) converter, a quadrature demodulator, and the like.

The quality acquisition section 104 extracts a CQI (Channel Quality Indicator) transmitted by the mobile station 200 or 200a from the received signal after the conversion process by the radio receiving section 103. A CQI is a value indicative of a communication quality, such as SNR (Signal-to-Noise Ratio), measured by the mobile station 200 or 200a. The quality acquisition section 104 outputs the CQI extracted to the control section 111.

The data buffer 105 is a buffer memory and temporarily stores user data to be transmitted to the mobile stations 200 and 200a. In accordance with instructions from the control section 111 the data buffer 105 outputs stored user data in order to the coding section 106. The data buffer 105 manages user data according to its destinations or types, so the data buffer 105 can divide its storage area into a plurality of areas.

The coding section 106 codes the user data acquired from the data buffer 105. For example, the coding section 106 performs a process including adding parity for error detection, error correction coding, and interleaving on the user data. At this time the coding section 106 performs coding at a coding rate designated by the control section 111. The coding rate is changed properly according to the communication quality. The coding section 106 then outputs the coded user data to the modulation section 108.

The control information generation section 107 generates control information in accordance with instructions from the control section 111 and outputs it to the modulation section 108. The control information generation section 107 generates information indicative of which data channel includes user data the destination of which is the mobile station 200 or 200a, information indicative of a modulation and coding scheme applied, information for making a request to report a CQI, or the like as control information.

The modulation section 108 modulates the user data acquired from the coding section 106 and the control information acquired from the control information generation section 107. For example, the modulation section 108 performs digital multilevel modulation such as 16QAM or 64QAM. At this time the modulation section 108 performs modulation according to a modulation method designated by the control section 111. A modulation method is changed properly according to the communication quality. The modulation section 108 then outputs a transmitted signal obtained to the radio sending section 109.

The control section 111 may designate a hierarchical modulation method as a modulation method. In this case, the control section 111 also designates a pair of mobile stations. The modulation section 108 combines data the destinations of which are the mobile stations paired by the control section 111, and hierarchically modulates it. For example, if the mobile stations 200 and 200a are paired, then the modulation section 108 combines user data the destination of which is the mobile station 200 and user data the destination of which is the mobile station 200a, and hierarchically modulates them. The details of the hierarchical modulation will be described later.

The radio sending section 109 performs a determined radio sending process on the transmitted signal acquired from the modulation section 108 to convert it. The radio sending section 109 outputs the transmitted signal after the conversion process to the antenna sharing device 102. In order to perform this conversion process, the radio sending section 109 includes a quadrature modulator, a D/A (Digital-to-Analog) converter, a frequency converter, a BPF, a power amplifier, and the like.

The table storage section 110 stores a hierarchical MCS table used for adaptive modulation coding. A nonrewritable or rewritable nonvolatile memory can be used as the table storage section 110. This hierarchical MCS table is defined as the result of simulations by the simulation apparatus 300. The hierarchical MCS table may statically be stored in advance in the table storage section 110. Alternatively, the hierarchical MCS table received from the simulation apparatus 300 may be stored in the table storage section 110. In addition, a plurality of hierarchical MCS tables may be stored in the table storage section 110.

The control section 111 controls a sending process by the base station 100. On the basis of the CQI acquired from the quality acquisition section 104, how the hierarchical MCS table is stored in the table storage section 110, and how the user data is stored in the data buffer 105, for example, the control section 111 controls the adaptive modulation coding. In addition, the control section 111 gives the control information generation section 107 instructions to generate control information indicative of a MCS applied. Furthermore, if a plurality of hierarchical MCS tables are stored in the table storage section 110, then the control section 111 switches a hierarchical MCS table to be used according to the state of communication and gives the control information generation section 107 instructions to generate control information indicative of the switching.

In the case of the hierarchical modulation, the control section 111 selects data to be transmitted at the next timing from user data stored in the data buffer 105, and determines a mobile station pair. For example, to select mobile stations at random or to select mobile stations between which the difference in CQI (communication quality) is large may be adopted as a method for selecting mobile stations to be paired. On the basis of the hierarchical MCS table stored in the table storage section 110 and a CQI for each of the mobile stations paired, the control section 111 then determines a hierarchical modulation method and coding rates for user data the destinations of which are the mobile stations paired. The control section 111 informs the coding section 106 of the coding rates for the user data the destinations of which are the mobile stations paired, and informs the modulation section 108 of the mobile station pair and the hierarchical modulation method.

Figure 4:
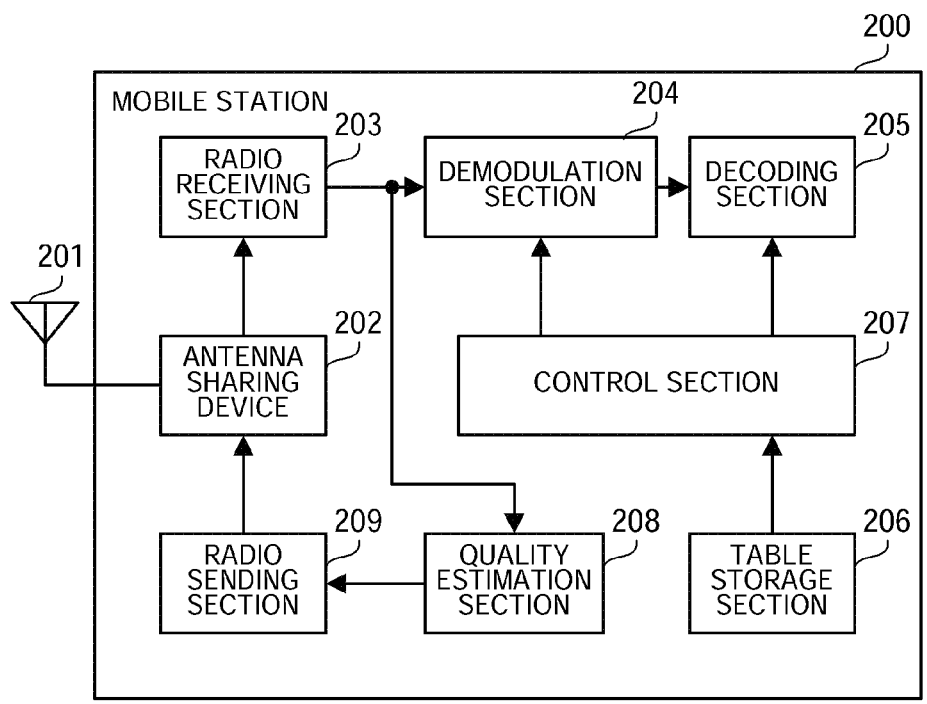
FIG. 4 is a block diagram of a mobile station.

FIG. 4 is a block diagram of the mobile station. The mobile station 200 includes an antenna 201, an antenna sharing device 202, a radio receiving section 203, a demodulation section 204, a decoding section 205, a table storage section 206, a control section 207, a quality estimation section 208, and a radio sending section 209. The mobile station 200a can also be realized by the same module structure that is adopted in the mobile station 200.

The antenna 201 is used both for sending and for receiving. The antenna 201 outputs a radio signal received from the base station 100 to the antenna sharing device 202. In addition, the antenna 201 radio-outputs a transmitted signal acquired from the antenna sharing device 202. However, a sending antenna and a receiving antenna which are separate from each other may be used.

The antenna sharing device 202 separates received signal and a transmitted signal for using the antenna 201 both for sending and for receiving. The antenna sharing device 202 outputs the received signal acquired from the antenna 201 to the radio receiving section 203. In addition, the antenna sharing device 202 makes the antenna 201 radio-output the transmitted signal acquired from the radio sending section 209. The antenna sharing device 202 includes, for example, a BPF for separating the received signal and the transmitted signal.

The radio receiving section 203 performs a determined radio receiving process on the received signal acquired from the antenna sharing device 202 to convert it. The radio receiving section 203 outputs the received signal after the conversion to the demodulation section 204. In order to perform this conversion process, the radio receiving section 203 includes a LNA, a frequency converter, a BPF, an A/D converter, a quadrature demodulator, and the like.

The demodulation section 204 demodulates the received signal acquired from the radio receiving section 203. For example, first the demodulation section 204 demodulates control information included in a control channel by a determined method or a method designated by the control section 207. When the demodulation section 204 can specify a data channel including user data the destination of which is the mobile station 200 and a modulation method for the user data by the control information, the demodulation section 204 demodulates the user data included in the data channel. The demodulation section 204 then outputs a demodulated signal obtained to the decoding section 205. The modulation method may be the hierarchical modulation method.

The decoding section 205 decodes the demodulated signal acquired from the demodulation section 204. For example, the decoding section 205 performs a process including deinterleaving, error correction decoding, error detection, and the like on the demodulated signal. Decoding is performed according to a coding rate specified by the control information included in the control channel. The decoding section 205 then outputs the user data obtained to a data processing section (not illustrated). The data processing section reproduces the user data according to its type.

The table storage section 206 stores the same hierarchical MCS table that is stored in the table storage section 110 of the base station 100. A nonrewritable or rewritable nonvolatile memory can be used as the table storage section 206. The hierarchical MCS table may statically be stored in advance in the table storage section 206. Alternatively, the hierarchical MCS table received from the base station 100 may be stored in the table storage section 206. In addition, a plurality of hierarchical MCS tables may be stored in the table storage section 206.

The control section 207 controls a receiving process by the mobile station 200. For example, on the basis of the control information received from the base station 100, the control section 207 controls the demodulation by the demodulation section 204 and the decoding by the decoding section 205. The control section 207 refers to the hierarchical MCS table stored in the table storage section 206, and specifies the correspondence between a value and the modulation method or the coding rate included in the control information. In addition, if a plurality of hierarchical MCS tables are stored in the table storage section 206, then the control section 207 switches a hierarchical MCS table to be used in accordance with instructions from the base station 100.

On the basis of the received signal after the conversion process by the radio receiving section 203, the quality estimation section 208 measures SNR for a down link. The quality estimation section 208 then outputs a CQI signal corresponding to the measured SNR to the radio sending section 209. SIR (Signal-to-Interference Ratio), SINR (Signal-to-Interference and Noise Ratio), receiving electric field strength, or the like may be used in place of SNR as an indicator of a communication quality for the down link.

The radio sending section 209 performs a determined radio sending process on the CQI signal acquired from the quality estimation section 208 to convert it. The radio sending section 209 outputs a signal obtained to the antenna sharing device 202. In order to perform this conversion process, the radio sending section 209 includes a quadrature modulator, a D/A converter, a frequency converter, a BPF, a power amplifier, and the like.

Figure 5:
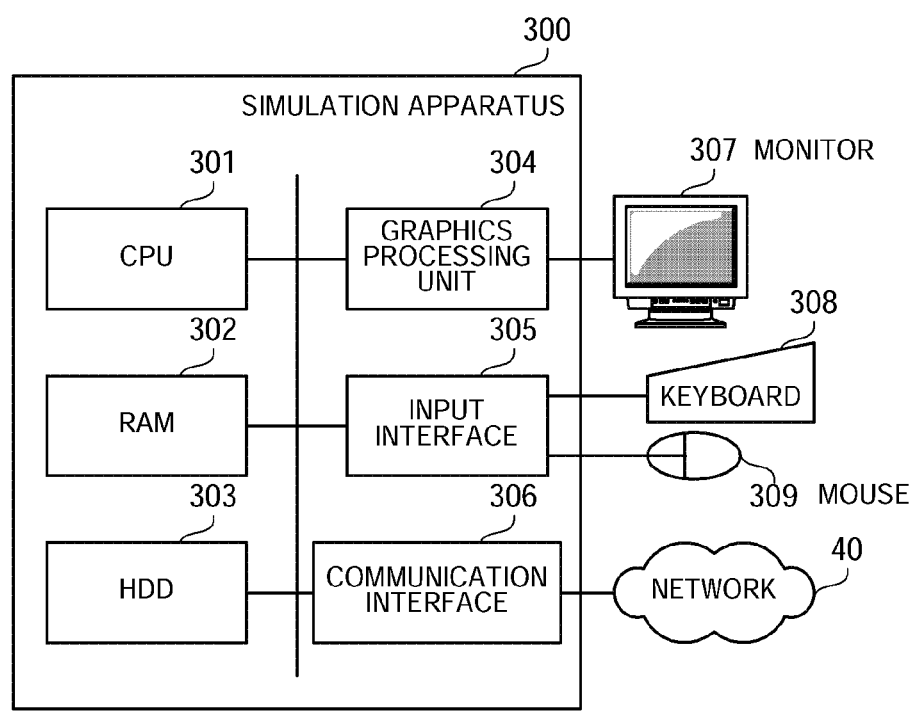
FIG. 5 is a block diagram of a simulation apparatus.

FIG. 5 is a block diagram of the simulation apparatus. The simulation apparatus 300 includes a CPU (Central Processing Unit) 301, a RAM (Random Access Memory) 302, a HDD (Hard Disk Drive) 303, a graphics processing unit 304, an input interface 305, and a communication interface 306. These modules are connected to a bus.

The CPU 301 controls the whole of the simulation apparatus 300. The CPU 301 executes an OS (Operating System) program and application programs. As a result, various functions of the simulation apparatus 300 are realized. The RAM 302 temporarily stores at least part of the OS program or an application program executed by the CPU 301. In addition, the RAM 302 temporarily stores various pieces of data which the CPU 301 uses for performing a process. The HDD 303 stores the OS program, the application programs, and various pieces of data which the CPU 301 uses for performing a process. However, a nonvolatile memory may be used in place of the HDD 303.

A monitor 307 is connected to the graphics processing section 304. In accordance with instructions from the CPU 301, the graphics processing unit 304 displays an image on the monitor 307. A keyboard 308 and a mouse 309 are connected to the input interface 305. The input interface 305 outputs a signal transmitted from the keyboard 308 or the mouse 309 to the CPU 301 via the bus. The communication interface 306 is connected to a network 40. The communication interface 306 exchanges data with, for example, another computer or communication apparatus via the network 40.

Figure 6:
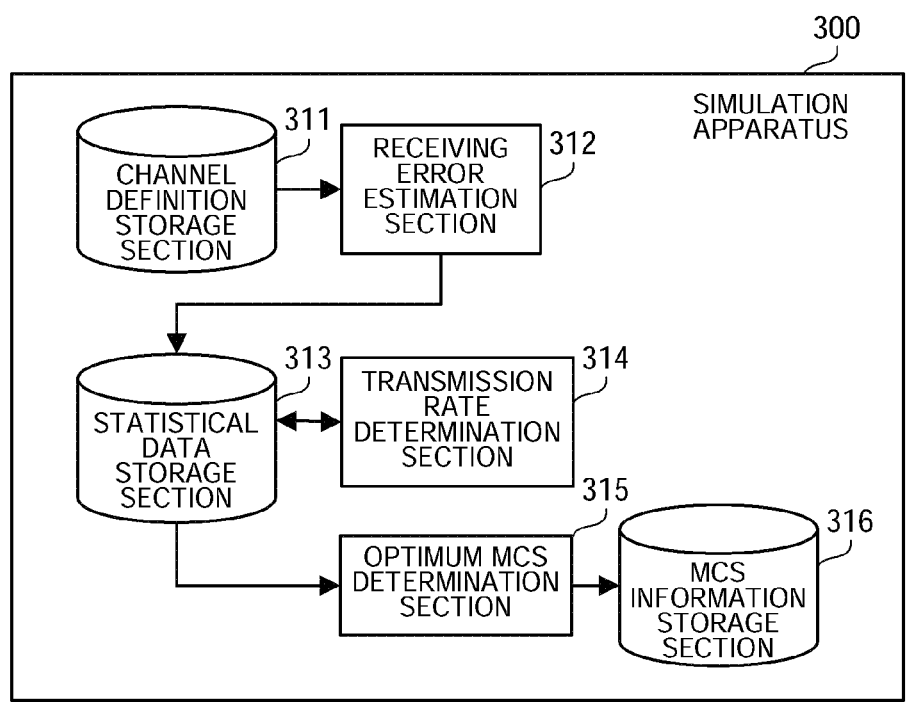
FIG. 6 is a block diagram which illustrates the functions of the simulation apparatus.

FIG. 6 is a block diagram which illustrates the functions of the simulation apparatus. The simulation apparatus 300 includes a channel definition storage section 311, a receiving error estimation section 312, a statistical data storage section 313, a transmission rate determination section 314, an optimum MCS determination section 315, and a MCS information storage section 316. The CPU 301 executes determined programs stored in the HDD 303. As a result, these functions are realized. However, all or part of these functions may be realized by hardware.

Definition information that defines hierarchical modulation methods which are objects of evaluation is stored in the channel definition storage section 311. A multilevel modulation method (such as 16QAM or 64QAM) applied to each channel, associating a plurality of information bits mapped to each channel with the mobile stations 200 and 200a, and the like are defined in the definition information. The definition information is generated before simulation by the operation of a user of the simulation apparatus 300 and is stored in the channel definition storage section 311.

The receiving error estimation section 312 reads out definition information for the hierarchical modulation methods from the channel definition storage section 311 and estimates a receiving error rate (BLER (Block Error Rate), for example) for each combination of a hierarchical modulation method and a coding rate at the time of changing a communication quality (such as SNR) for a down link. A receiving error rate may be a theoretical value obtained by a determined calculation method or a value obtained by referring to experimental data. The receiving error estimation section 312 then stores receiving error rate data generated in the statistical data storage section 313.

The receiving error rate data generated by the receiving error estimation section 312 is stored in the statistical data storage section 313. This receiving error rate data is read out by the transmission rate determination section 314. In addition, transmission rate data which is generated by the transmission rate determination section 314 and which will be described later is stored in the statistical data storage section 313. This transmission rate data is read out by the optimum MCS determination section 315.

The transmission rate determination section 314 reads out the receiving error rate data from the statistical data storage section 313 and determines a transmission rate for each hierarchical modulation method which is realized at the time of changing a communication quality (such as SNR) for the down link. To be concrete, first the transmission rate determination section 314 sets an allowable receiving error rate (BLER=10%, for example). The transmission rate determination section 314 then determines the upper limit of a coding rate for maintaining the set receiving error rate according to communication quality. Furthermore, the transmission rate determination section 314 calculates a realizable transmission rate from a hierarchical modulation method and a coding rate. The transmission rate determination section 314 stores transmission rate data generated in the statistical data storage section 313.

The optimum MCS determination section 315 reads out the transmission rate data from the statistical data storage section 313 and generates a hierarchical MCS table. To be concrete, the optimum MCS determination section 315 calculates an evaluation value for each combination of communication qualities (such as SNRs) for two mobile stations paired according to hierarchical modulation method. An evaluation value is calculated by a determined evaluation expression on the basis of, for example, transmission rates realized for the two mobile stations. The optimum MCS determination section 315 then determines a hierarchical modulation method for which an evaluation value is the highest as the hierarchical modulation method corresponding to a combination of communication qualities. In addition, the optimum MCS determination section 315 associates coding rates for realizing the transmission rates with a combination of communication qualities. The optimum MCS determination section 315 stores a hierarchical MCS table generated in the MCS information storage section 316.

The hierarchical MCS table generated by the optimum MCS determination section 315 is stored in the MCS information storage section 316. This hierarchical MCS table is installed on the base station 100 and the mobile stations 200 and 200a. By switching the evaluation expression used by the optimum MCS determination section 315, a plurality of hierarchical MCS tables can be prepared. The details of the evaluation expression will be described later.

Processes performed in the system having the above structure will now be described more concretely. A hierarchical MCS table generation process by the simulation apparatus 300 will be described first. A sending process by the base station 100 and a receiving process by the mobile station 200 or 200a will then be described.

Figure 7:
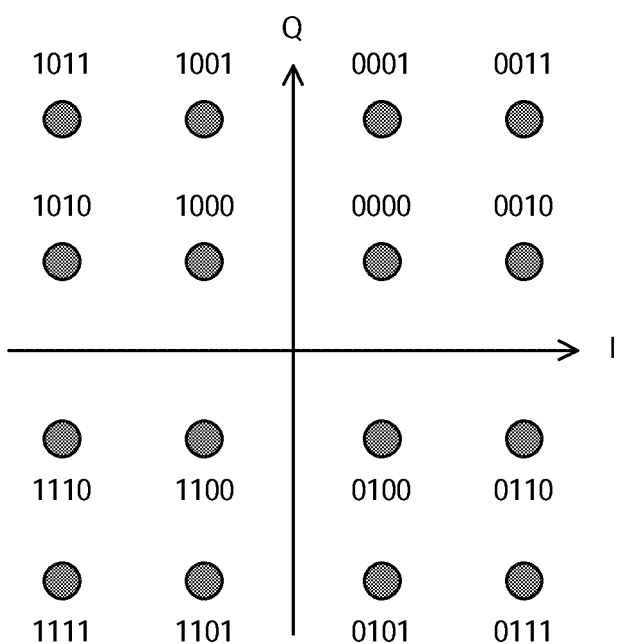
FIG. 7 illustrates an example of bit assignment in 16QAM.

FIG. 7 illustrates an example of bit assignment in 16QAM. With QAM the amplitude and phases of I and Q carriers which are independent of each other are controlled. By doing so, a plurality of information bits can be transmitted. With 16QAM 4 information bits can be mapped to one symbol. In the example of FIG. 7, the 2 higher-order bits of 4 bits are assigned to differentiate among the 4 quadrants on the I-Q plane. To be concrete, "00", "10", "11", and "01" are assigned to the first, second, third, and fourth quadrants respectively. In addition, the 2 lower-order bits are assigned to differentiate among 4 points in each quadrant. Assignment is performed so that the difference between adjacent points will be only one of the four bits.

If bit assignment is performed in this way, an error is comparatively unapt to occur in the 2 higher-order bits and an error is comparatively apt to occur in the 2 lower-order bits. Accordingly, in the following description the 2 higher-order bits and the 2 lower-order bits will be referred to as MSBs (Most Significant Bits) and LSBs (Least Significant Bits), respectively, for 16QAM. That is to say, an error is comparatively unapt to occur in the MSBs and an error is comparatively apt to occur in the LSBs.

Figure 8:
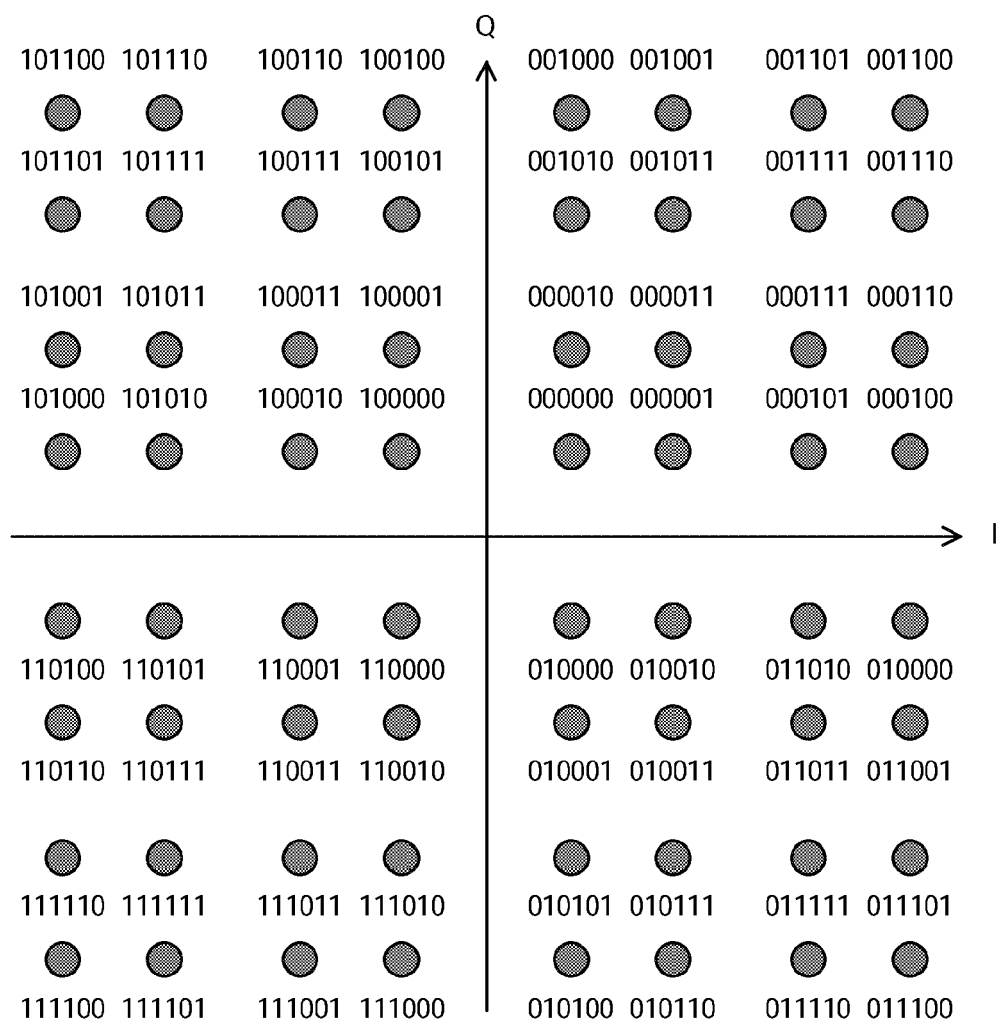
FIG. 8 illustrates an example of bit assignment in 64QAM.

FIG. 8 illustrates an example of bit assignment in 64QAM. With 64QAM 6 information bits can be mapped to one symbol. In the example of FIG. 8, the 2 higher-order bits of 6 bits are assigned to differentiate among the 4 quadrants on the I-Q plane. The 2 middle bits are assigned to differentiate among 4 groups in each quadrant. In addition, the 2 lower-order bits of are assigned to differentiate among 4 points in each group. Assignment is performed so that the difference between adjacent points will be only one of the six bits.

If bit assignment is performed in this way, an error is comparatively unapt to occur in the 2 higher-order bits and an error is comparatively apt to occur in the 2 lower-order bits. The aptness of an error to occur in the 2 middle bits is roughly intermediate between the 2 higher-order bits and the 2 lower-order bits. Accordingly, in the following description the 2 higher-order bits, the 2 middle bits, and the 2 lower-order bits will be referred to as MSBs, SBs (Significant Bits), and LSBs, respectively, for 64QAM. That is to say, an error is comparatively unapt to occur in the MSBs, an error is comparatively apt to occur in the LSBs, and the aptness of an error to occur in the 2 middle bits is roughly intermediate between the 2 higher-order bits and the 2 lower-order bits.

Figure 9A:
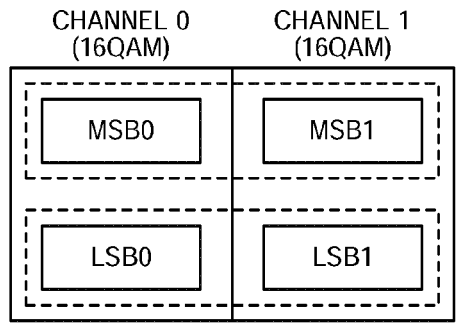
FIG. 9 illustrates examples of hierarchically modulated channels.
Figure 9B:
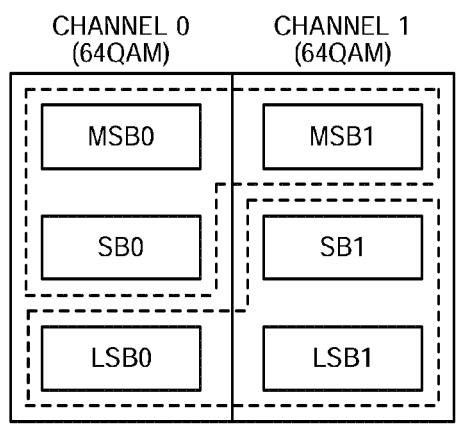
Figure 9C:
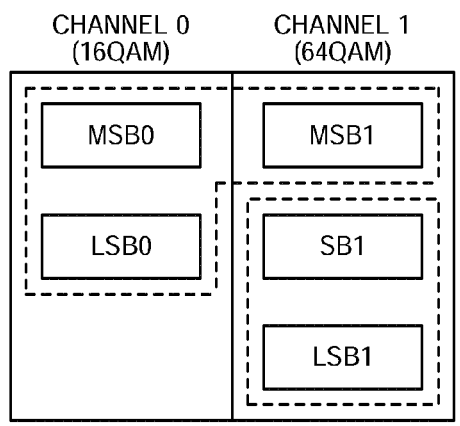

FIG. 9 illustrates examples of hierarchically modulated channels. In these examples, it is assumed that two channels (channels 0 and 1) are used for hierarchically modulating user data the destinations of which are two mobile stations (mobile stations 200 and 200a).

In example (A), the channels 0 and 1 are multilevel-modulated by 16QAM. One hierarchically modulated channel is formed of MSBs (MSB0) of the channel 0 and MSBs (MSB1) of the channel 1. The other hierarchically modulated channel is formed of LSBs (LSB0) of the channel 0 and LSBs (LSB1) of the channel 1. For example, the hierarchically modulated channel (MSB0+MSB1) may be assigned to the user data the destination of which is the mobile station 200a for which a communication quality is low, and the hierarchically modulated channel (LSB0+LSB1) may be assigned to the user data the destination of which is the mobile station 200 for which a communication quality is high.

In example (B), the channels 0 and 1 are multilevel-modulated by 64QAM. One hierarchically modulated channel is formed of MSBs (MSB0) and SBs (SB0) of the channel 0 and MSBs (MSB1) of the channel 1. The other hierarchically modulated channel is formed of LSBs (LSB0) of the channel 0 and SBs (SB1) and LSBs (LSB1) of the channel 1. For example, the hierarchically modulated channel (MSB0+MSB1+SB0) may be assigned to the user data the destination of which is the mobile station 200a for which a communication quality is low, and the hierarchically modulated channel (SB1+LSB0+LSB1) may be assigned to the user data the destination of which is the mobile station 200 for which a communication quality is high.

In example (C), the channel 0 is multilevel-modulated by 16QAM and the channel 1 is multilevel-modulated by 64QAM. One hierarchically modulated channel is formed of MSBs (MSB0) and LSBs (LSB0) of the channel 0 and MSBs (MSB1) of the channel 1. The other hierarchically modulated channel is formed of SBs (SB1) and LSBs (LSB1) of the channel 1. For example, the hierarchically modulated channel (MSB0+MSB1+LSB0) may be assigned to the user data the destination of which is the mobile station 200a for which a communication quality is low, and the hierarchically modulated channel (SB1+LSB1) may be assigned to the user data the destination of which is the mobile station 200 for which a communication quality is high.

If the hierarchical modulation is not applied, the user data the destination of which is the mobile station 200 and the user data the destination of which is the mobile station 200a are mapped to, for example, the channels 0 and 1 respectively. On the other hand, if the hierarchical modulation is applied, the user data the destination of which is the mobile station 200 and the user data the destination of which is the mobile station 200a are combined and are mapped to the channels 0 and 1. By preferentially mapping user data the destination of which is a mobile station for which a communication quality is low to bits in which an error is unapt to occur, communication throughput can be enhanced. Various modifications of above methods for combining MSBs, SBs, and LSBs are possible. Furthermore, the above MSBs, SBs, and LSBs include 2 bits. However, the number of the above MSBs, SBs, and LSBs is not limited to 2.

FIG. 10 illustrates a first example of a hierarchically modulated channel definition table. Tables 321 and 322 are stored in advance in the channel definition storage section 311 of the simulation apparatus 300 before simulations are begun.

Each of the tables 321 and 322 includes UE0 and UE1 items. A hierarchically modulated channel for one (mobile station 200a, for example) of two mobile stations paired for which a communication quality is lower is set in the UE0 item. A hierarchically modulated channel for the other (mobile station 200, for example) for which a communication quality is higher is set in the UE1 item. Pieces of information in these items arranged in the horizontal direction are combined and definition information for one hierarchical modulation method is obtained.

The table 321 indicates candidate hierarchical modulation methods given in the case of multilevel-modulating the two channels by QPSK (Quadrature Phase Shift Keying). "I0" is an I component of the channel 0, "Q0" is a Q component of the channel 0, "I1" is an I component of the channel 1, and "Q1" is a Q component of the channel 1. With a second candidate in the table 321, for example, the I component of the channel 0 and the Q component of the channel 1 are assigned to a low-quality mobile station and the Q component of the channel 0 and the I component of the channel 1 are assigned to a high-quality mobile station. A first candidate is enumerated as one of the hierarchical modulation methods. However, practical hierarchical modulation is not performed.

The table 322 indicates candidate hierarchical modulation methods given in the case of multilevel-modulating the two channels by 16QAM. The meanings of MSB0, MSB1, LSB0, and LSB 1 are described above. With a second candidate, for example, MSBs of the channel 0 and MSBs of the channel 1 are assigned to a low-quality mobile station and LSBs of the channel 0 and LSBs of the channel 1 are assigned to a high-quality mobile station. A first candidate is enumerated as one of the hierarchical modulation methods. However, practical hierarchical modulation is not performed.

FIG. 11 illustrates a second example of a hierarchically modulated channel definition table. Tables 323 and 324 are stored in advance in the channel definition storage section 311 of the simulation apparatus 300 before simulations are begun. The structure of the tables 323 and 324 is the same as that of the above tables 321 and 322.

The table 323 indicates candidate hierarchical modulation methods given in the case of multilevel-modulating the two channels by 64QAM. The meanings of MSB0, MSB1, SB0, SB1, LSB0, and LSB1 are described above. With a second candidate, for example, MSBs of the channel 0 and MSBs of the channel 1 are assigned to a low-quality mobile station and SBs and LSBs of the channel 0 and SBs and LSBs of the channel 1 are assigned to a high-quality mobile station. A first candidate is enumerated as one of the hierarchical modulation methods. However, practical hierarchical modulation is not performed.

The table 324 indicates candidate hierarchical modulation methods given in the case of multilevel-modulating one channel (channel 0) by 16QAM and multilevel-modulating the other channel (channel 1) by 64QAM. The meanings of MSB0, MSB1, SB1, LSB0, and LSB1 are described above. With a second candidate, for example, MSBs and LSBs of the channel 0 and MSBs of the channel 1 are assigned to a low-quality mobile station and SBs and LSBs of the channel 1 are assigned to a high-quality mobile station. A first candidate is enumerated as one of the hierarchical modulation methods. However, practical hierarchical modulation is not performed.

Figure 12:
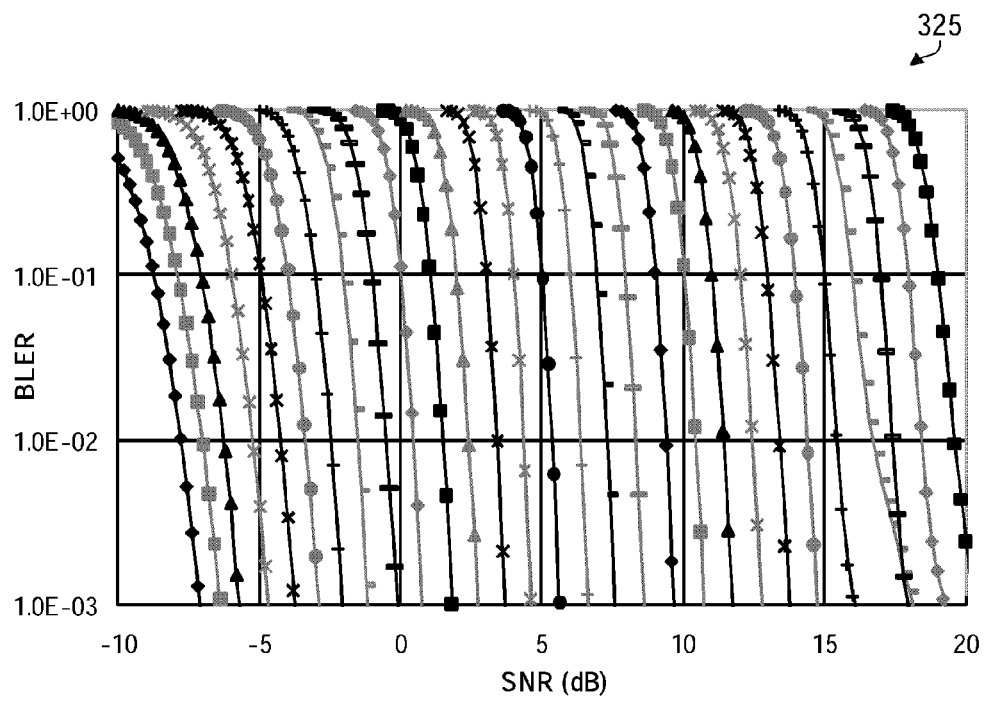
FIG. 12 is a graph which indicates the correspondence between SNR and a block error rate.

FIG. 12 is a graph which indicates the correspondence between SNR and a block error rate. BLER data indicated by a graph 325 is generated by the receiving error estimation section 312 of the simulation apparatus 300 and is stored in the statistical data storage section 313. Such BLER data is generated for each hierarchically modulated channel, that is to say, for each of UE0 and UE1 in each hierarchical modulation method. With the graph 325, two channels are multilevel-modulated by 64QAM and a hierarchically modulated channel includes MSB0, MSB1, and SB0.

A horizontal axis and a vertical axis of the graph 325 indicate SNR (dB) and a BLER (no unit) respectively. The simulation apparatus 300 draws a SNR-BLER curve according to coding rate. For example, a leftmost curve on the graph 325 is obtained in the case of a coding rate being 40/2400 (=0.0166667). A rightmost curve on the graph 325 is obtained in the case of a coding rate being 2232/2400 (=0.93). SNR-BLER curves obtained for 29 coding rates are drawn on the graph 325. An indicator indicative of a communication quality other than SNR may be used as the horizontal axis of the graph 325 and an indicator indicative of a receiving error rate other than a BLER may be used as the vertical axis of the graph 325.

Figure 13:
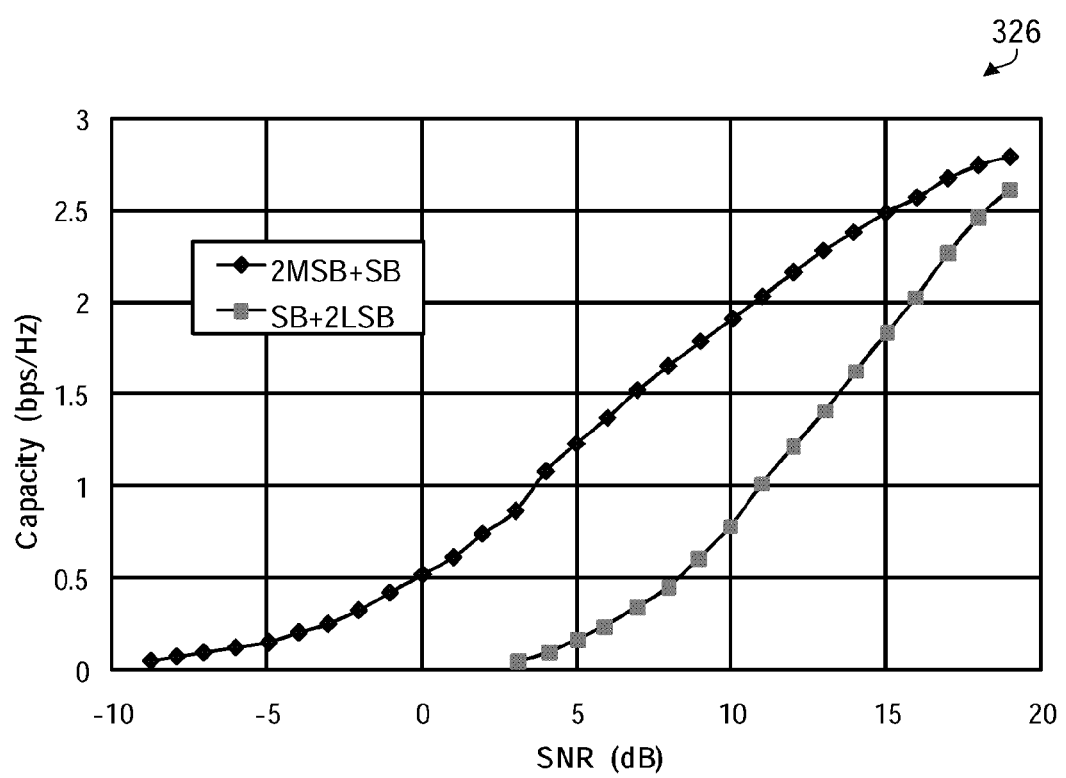
FIG. 13 is a graph which indicates the correspondence between SNR and a transmission rate.

FIG. 13 is a graph which indicates the correspondence between SNR and a transmission rate. Transmission rate data indicated by a graph 326 is generated by the transmission rate determination section 314 of the simulation apparatus 300 and is stored in the statistical data storage section 313. Such transmission rate data is generated for each hierarchical modulation method. With the graph 326, two channels are multilevel-modulated by 64QAM and a hierarchical modulation method in which MSB0, MSB1, and SB0 are assigned to UE0 and in which SB1, LSB0, and LSB1 are assigned to UE1 is adopted.

A horizontal axis and a vertical axis of the graph 326 indicate SNR (dB) and a transmission rate (bps/Hz) respectively. On the basis of the SNR-BLER graph, the simulation apparatus 300 draws a SNR-(transmission rate) curve for each of UE0 and UE1. To be concrete, first the simulation apparatus 300 sets an allowable BLER threshold (0.1, for example). The simulation apparatus 300 then finds a coding rate for realizing the set BLER threshold according to SNR. For example, by detecting the intersection of each curve on the graph 325 and BLER=0.1, the simulation apparatus 300 finds the correspondence between SNR and a coding rate. The simulation apparatus 300 then calculates a transmission rate from a modulation method and a coding rate. By doing so, the correspondence between SNR and a transmission rate is found. An indicator indicative of a communication quality other than SNR may be used as the horizontal axis of the graph 326.

On the basis of transmission rate data like those indicated by the graph 326, the simulation apparatus 300 determines a hierarchical modulation method which is most suitable for a combination of SNRs for two mobile stations. At this time the simulation apparatus 300 uses an evaluation expression for calculating an evaluation value from the two SNRs. Two examples of an evaluation expression used by the simulation apparatus 300 will now be given.

A first evaluation expression will be described first. The first evaluation expression is derived on the basis of a first evaluation criterion. With the first evaluation criterion the following premise is assumed. It is preferable to keep the ratio between the throughputs of two mobile stations paired constant by controlling the amount of a channel resource assigned. That is to say, the relationship given by $$C_0 = \delta \cdot C_1 \tag{1}$$

is assumed as a premise, where $C_0$ is a throughput to be realized by UE0, $C_1$ is a throughput to be realized by UE1, and $\delta$ is a coefficient for indicating the ratio between the throughputs. If all mobile stations are treated fairly, then $\delta$ can be set to 1.

$C_0$ and $C_1$ can be defined as:

$$C_0 = 2R_0(\gamma_0) \cdot (1-\mu) \tag{2}$$

$$C_1 = 2R_1(\gamma_1) \cdot \mu \tag{3}$$

where $\gamma_0$ is a SNR for UE0, $\gamma_1$ is a SNR for UE1, $\mu$ is the ratio between the amount of channel resources assigned to UE0 and UE1, $R_0(\gamma)$ is a function for finding a transmission rate corresponding to the SNR for UE0, and $R_1(\gamma)$ is a function for finding a transmission rate corresponding to the SNR for UE1. These functions correspond to the curves on the graph 326 given in FIG. 13 and depend on hierarchical modulation methods. In the case of TDMA (Time Division Multiple Access), a channel resource means a time resource. In the case of FDMA (Frequency Division Multiple Access), a channel resource means a frequency resource. In the case of CDMA (Code Division Multiple Access), a channel resource means a code resource.

By substituting equations (2) and (3) in equation (1) and changing equation (1), the following equation (4) about $\mu$ is obtained.

$$\mu = \frac{R_0(\gamma_0)}{R_0(\gamma_0) + \delta \cdot R_1(\gamma_1)} \tag{4}$$

By substituting equation (4) in equations (2) and (3), the following equations (5) and (6) about throughput which do not include $\mu$ are obtained.

$$C_0 = \frac{2\delta \cdot R_0(\gamma_0) \cdot R_1(\gamma_1)}{R_0(\gamma_0) + \delta \cdot R_1(\gamma_1)} \tag{5}$$

$$C_1 = \frac{2R_0(\gamma_0) \cdot R_1(\gamma_1)}{R_0(\gamma_0) + \delta \cdot R_1(\gamma_1)} \tag{6}$$

If the sum of $C_0$ and $C_1$ is considered as a total throughput $C^1_{Total}$, then the following equation (7) is obtained.

$$C^1_{Total} = \frac{2(1+\delta) \cdot R_0(\gamma_0) \cdot R_1(\gamma_1)}{R_0(\gamma_0) + \delta \cdot R_1(\gamma_1)} \tag{7}$$

Equation (7) can be used as the first evaluation expression. According to the first evaluation expression, an evaluation value can be calculated from a hierarchical modulation method and the SNRs for the mobile stations paired.

A second evaluation expression will be described next. The second evaluation expression is derived on the basis of a second evaluation criterion. With the second evaluation criterion the premise that the same amount of a channel resource is assigned to two mobile stations paired is assumed. In the case of TDMA, this means that time slots which are equal in time length are assigned. In the case of FDMA, this means that frequency bands which are equal in width are assigned. In the case of CDMA, codes which are equal in number are assigned. If this premise is assumed, the ratio between the throughputs of the two mobile stations does not become constant.

With the second evaluation criterion, as given by equation (8), a total throughput $C^2_{Total}$ is defined as the sum of a transmission rate for UE0 and a transmission rate for UE1.

$$C^2_{Total} = R_0(\gamma_0) + R_1(\gamma_1) \tag{8}$$

Equation (8) can be used as the second evaluation expression. According to the second evaluation expression, an evaluation value can be calculated from a hierarchical modulation method and SNRs for the mobile stations paired. This is the same with the first evaluation expression.

Figure 14:
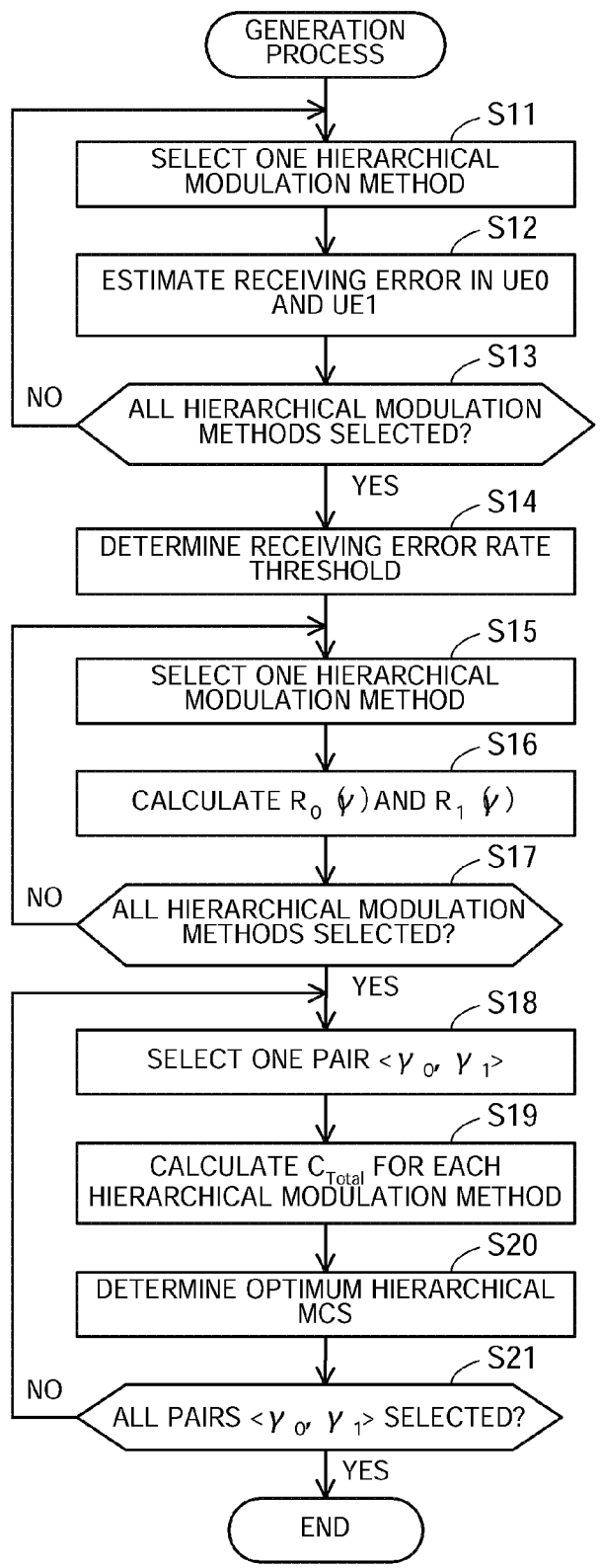
FIG. 14 is a flow chart of a process for generating a hierarchical MCS table.

FIG. 14 is a flow chart of a process for generating a hierarchical MCS table. This generation process is performed by the simulation apparatus 300. The process illustrated in FIG. 14 will now be described in order of step number.

(Step S11) The receiving error estimation section 312 reads out definition information stored in the channel definition storage section 311, and selects one hierarchical modulation method.

(Step S12) The receiving error estimation section 312 estimates the correspondence between a communication quality (such as SNR) and a receiving error rate (such as a BLER) according to coding rate for each of hierarchically modulated channels UE0 and UE1. That is to say, the receiving error estimation section 312 generates data like those indicated by the graph 325 given in FIG. 12. The receiving error estimation section 312 then stores the data generated in the statistical data storage section 313.

(Step S13) The receiving error estimation section 312 determines whether all hierarchical modulation methods defined have been selected in step S11. If all the hierarchical modulation methods defined have been selected, then step S14 is performed. If there is a hierarchical modulation method which has not been selected yet, then step S11 is performed.

(Step S14) The transmission rate determination section 314 determines an allowable receiving error rate threshold (BLER=0.1, for example).

(Step S15) The transmission rate determination section 314 selects one hierarchical modulation method.

(Step S16) The transmission rate determination section 314 generates (communication quality)—(transmission rate) data for each of UE0 and UE1 from (communication quality)—(receiving error rate) data stored in the statistical data storage section 313 and the threshold determined in step S14. That is to say, the transmission rate determination section 314 specifies a coding rate for realizing a receiving error rate set as the threshold for each communication quality and finds a transmission rate from a hierarchical modulation method and the coding rate. As a result, the above functions $R_0(\gamma)$ and $R_1(\gamma)$ are obtained. The transmission rate determination section 314 then stores the data generated in the statistical data storage section 313.

(Step S17) The transmission rate determination section 314 determines whether all the hierarchical modulation methods defined have been selected in step S15. If all the hierarchical modulation methods defined have been selected, then step S18 is performed. If there is a hierarchical modulation method which has not been selected yet, then step S15 is performed.

(Step S18) The optimum MCS determination section 315 selects one communication quality pair <$\gamma_0,\gamma_1$> corresponding to UE0 and UE1 within a determined communication quality. For example, the optimum MCS determination section 315 selects a SNR pair in the range of −10 to 20 dB.

(Step S19) The optimum MCS determination section 315 calculates an evaluation value $C_{Total}$ for each hierarchical modulation method from the communication quality pair <$\gamma_0, \gamma_1$> selected in step S18 and the functions $R_0(\gamma)$ and $R_1(\gamma)$ which are functions of a transmission rate in each hierarchical modulation method and which are found in step S16. For example, the above first or second evaluation expression can be used for calculating an evaluation value. Which evaluation expression to use should be determined in advance.

(Step S20) The optimum MCS determination section 315 specifies a hierarchical modulation method for which an evaluation value $C_{Total}$ calculated in step S19 is the highest. In addition, the optimum MCS determination section 315 specifies a coding rate for each of UE0 and UE1 for realizing a corresponding transmission rate. As a result, a hierarchical MCS most suitable for the communication quality pair <$\gamma_0, \gamma_1$> selected in step S18 is determined.

(Step S21) The optimum MCS determination section 315 determines whether all communication quality pairs have been selected in step S18. If all the communication quality pairs have been selected, then the generation process terminates. If there is a communication quality pair which has not been selected yet, then step S18 is performed.

As has been described, the simulation apparatus 300 does simulations on the basis of information for candidate hierarchical modulation methods and generates hierarchical MCS table. That is to say, first the simulation apparatus 300 estimates the correspondence between a communication quality and a receiving error rate for each hierarchical modulation method. The simulation apparatus 300 then finds the correspondence between a communication quality and a transmission rate. In addition, the simulation apparatus 300 determines the most suitable hierarchical modulation method and the coding rates of user data for UE0 and UE1 for each communication quality pair corresponding to UE0 and UE1.

FIG. 15 illustrates a first example of a channel type definition table. A table 327 is generated by the optimum MCS determination section 315 of the simulation apparatus 300 and is stored in the MCS information storage section 316. Hierarchical modulation methods which appear in the hierarchical MCS table are enumerated in the table 327. The table 327 is generated on the basis of the above first evaluation criterion.

The table 327 includes Channel Type, UE0, and UE1 items. A number for identifying a hierarchical modulation method is set in the Channel Type item. A hierarchically modulated channel for one of two mobile stations paired for which a communication quality is lower is set in the UE0 item. A hierarchically modulated channel for the other for which a communication quality is higher is set in the UE1 item. Pieces of information in these items arranged in the horizontal direction are combined and information for one hierarchical modulation method is obtained.

With the channel type 4 hierarchical modulation method, for example, the two channels are multilevel-modulated by 16QAM. MSBs of the channel 0 and MSBs of the channel 1 are assigned to a low-quality mobile station and LSBs of the channel 0 and LSBs of the channel 1 are assigned to a high-quality mobile station. With the channel type 0, channel type 1, and channel type 2 methods, practical hierarchical modulation is not performed. These methods are ordinary multilevel modulation methods.

Figure 16:
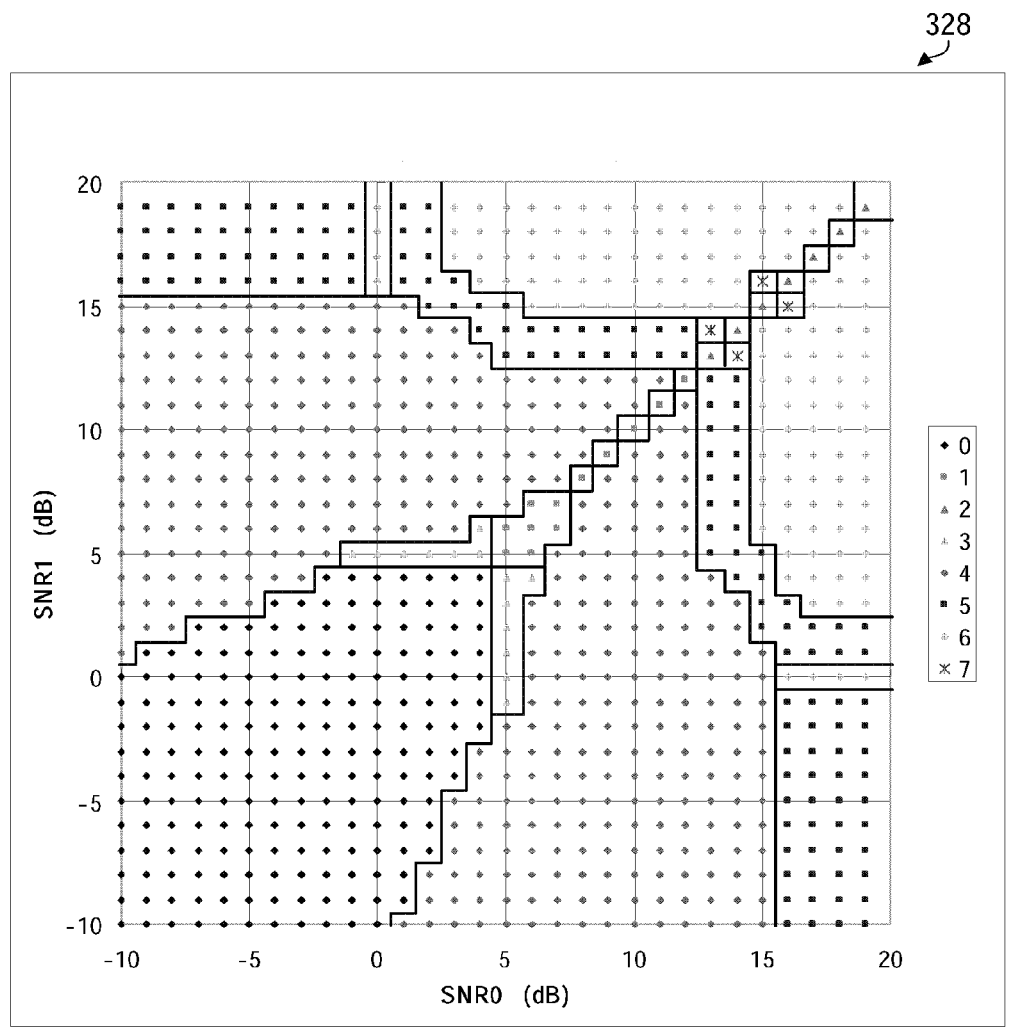
FIG. 16 illustrates a first example of a hierarchical MCS table.

FIG. 16 illustrates a first example of a hierarchical MCS table. A table 328 is generated by the optimum MCS determination section 315 of the simulation apparatus 300 and is stored in the MCS information storage section 316. The table 328 represents the correspondence between a SNR pair and a MCS by two-dimensional data structure and is generated on the basis of the above first evaluation criterion.

The length and breadth of the table 328 correspond to SNRs in the range of −10 to 20 dB. A hierarchical modulation method and coding rates are defined for each point in the table 328. The condition that (communication quality for UE0)< (communication quality for UE1) is set by the definition of a hierarchical modulation method, so the table 328 is symmetrical with respect to a straight line on which SNR0=SNR1.

For example, if both of two SNRs are low, the channel type 0 method (using QPSK) in which practical hierarchical modulation is not performed is most suitable according to the first evaluation criterion. Similarly, if both of two SNRs are moderate, the channel type 1 method (using 16QAM) in which practical hierarchical modulation is not performed is most suitable. If both of two SNRs are high, the channel type 2 method (using 64QAM) in which practical hierarchical modulation is not performed is most suitable. In other words, if the difference between two SNRs is smaller than or equal to a determined value, it is preferable by definition that hierarchical modulation should not be performed.

On the other hand, if only one of two SNRs is high, the channel type 4 method (hierarchical modulation method using 16QAM) is most suitable. If only one SNR is much higher, the channel type 5 or 6 method (hierarchical modulation method using 64QAM) is most suitable. In other words, if the difference between two SNRs is greater than the determined value, it is preferable by definition that hierarchical modulation should be performed. By referring to the above hierarchical MCS table, the most suitable hierarchical modulation method and coding rates can be selected on the basis of SNRs for mobile stations paired.

Figure 17:
FIG. 17 illustrates a second example of a channel type definition table.

FIG. 17 illustrates a second example of a channel type definition table. A table 329 is generated by the optimum MCS determination section 315 of the simulation apparatus 300 and is stored in the MCS information storage section 316. Hierarchical modulation methods which appear in the hierarchical MCS table are enumerated in the table 329. The table 329 is generated on the basis of the above second evaluation criterion.

The table 329 includes Channel Type, UE0, and UE1 items. This is the same with the table 327. With a channel type 3 hierarchical modulation method, for example, two channels are multilevel-modulated by 16QAM. MSBs of the channel 0 and MSBs of the channel 1 are assigned to a low-quality mobile station and LSBs of the channel 0 and LSBs of the channel 1 are assigned to a high-quality mobile station. With channel type 0, channel type 1, and channel type 2 methods, practical hierarchical modulation is not performed. These methods are ordinary multilevel modulation methods.

Figure 18:
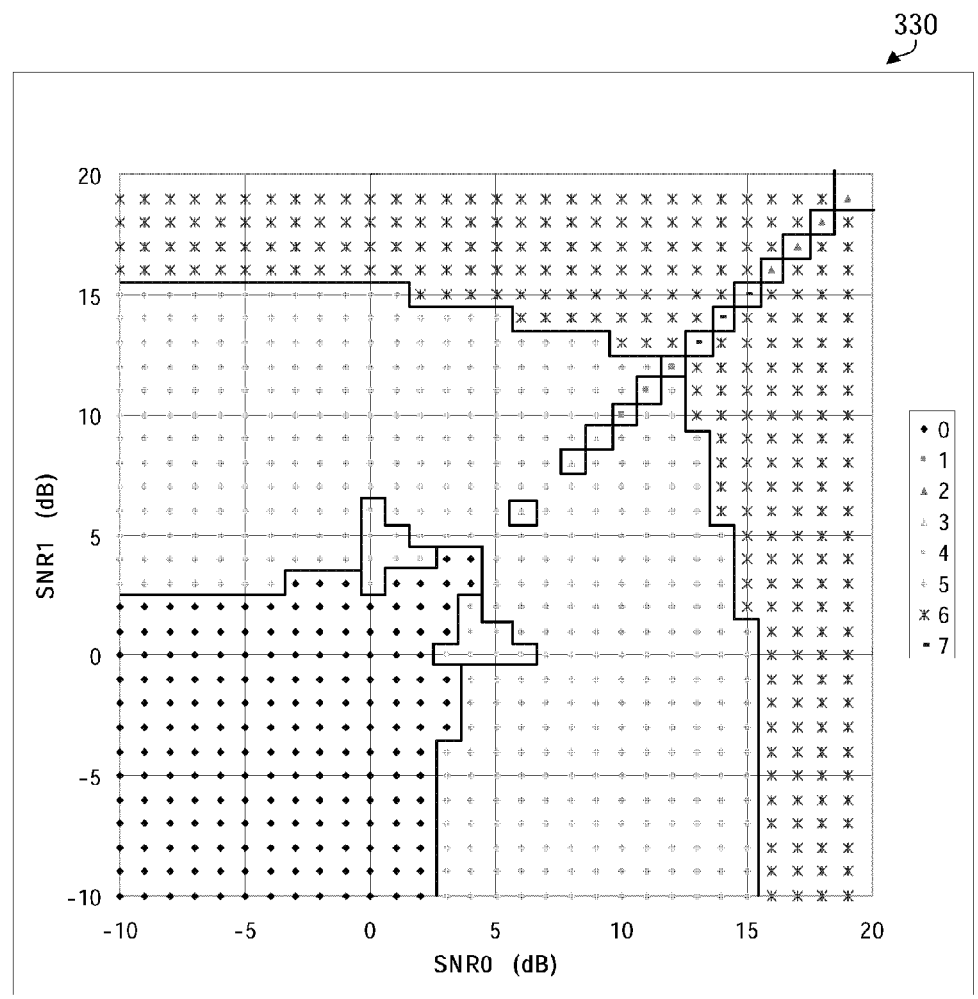
FIG. 18 illustrates a second example of a hierarchical MCS table.

FIG. 18 illustrates a second example of a hierarchical MCS table. A table 330 is generated by the optimum MCS determination section 315 of the simulation apparatus 300 and is stored in the MCS information storage section 316. The table 330 represents the correspondence between a SNR pair and a MCS by two-dimensional data structure and is generated on the basis of the above second evaluation criterion. Like the table 328, the length and breadth of the table 330 correspond to SNRs in the range of −10 to 20 dB. A hierarchical modulation method and coding rates are defined for each point in the table 330. The table 330 is symmetrical with respect to a straight line on which SNR0=SNR1.

For example, if both of two SNRs are low, the channel type 0 method (using QPSK) in which practical hierarchical modulation is not performed is most suitable according to the second evaluation criterion. If at least one of two SNRs is high, the channel type 5 method (hierarchical modulation method using 16QAM) has a tendency to become most suitable. If at least one of two SNRs is much higher, the channel type 6 method (hierarchical modulation method using 64QAM) has a tendency to become most suitable. By referring to the above hierarchical MCS table, the most suitable hierarchical modulation method and coding rates can be selected on the basis of SNRs for mobile stations paired.

Figure 19:
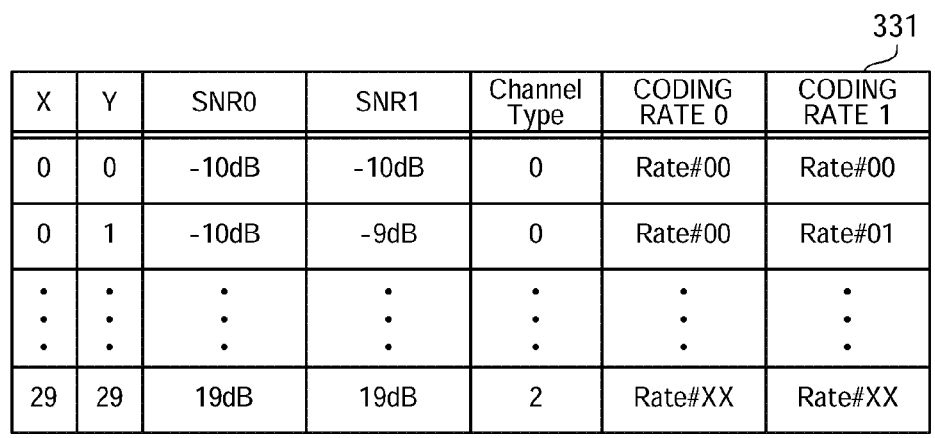
FIG. 19 illustrates another example of the data structure of a hierarchical MCS table.

FIG. 19 illustrates another example of the data structure of a hierarchical MCS table. The hierarchical MCS table illustrated in FIG. 16 or 18 can also be represented as data structure like that of a table 331. The table 331 can be stored in the MCS information storage section 316 of the simulation apparatus 300. In addition, the table 331 can be installed on the base station 100 and the mobile stations 200 and 200a.

The table 331 includes X-Coordinate, Y-Coordinate, SNR0, SNR1, Channel Type, Coding Rate 0, and Coding Rate 1 items. Pieces of information in these items arranged in the horizontal direction are associated with one another.

A number (0 through 29) for identifying a position on the horizontal axis of FIG. 16 or 18 is set in the X-Coordinate item. A number (0 through 29) for identifying a position on the vertical axis of FIG. 16 or 18 is set in the Y-Coordinate item. These identification numbers are given at intervals of, for example, 1 dB. A SNR for UE0 is set in the SNR0 item. A SNR for UE1 is set in the SNR1 item. If the coordinates are set at intervals of 1 dB, then "−10 dB" means a value which is greater than or equal to −10 dB and which is smaller than −9 dB. A number for identifying a hierarchical modulation method is set in the Channel Type item. A coding rate applied to user data for UE0 is set in the Coding Rate 0 item. A coding rate applied to user data for UE1 is set in the Coding Rate 1 item.

Transmitting user data from the base station 100 to the mobile stations 200 and 200a by the use of a hierarchical MCS table generated in this way will now be described.

Figure 20:
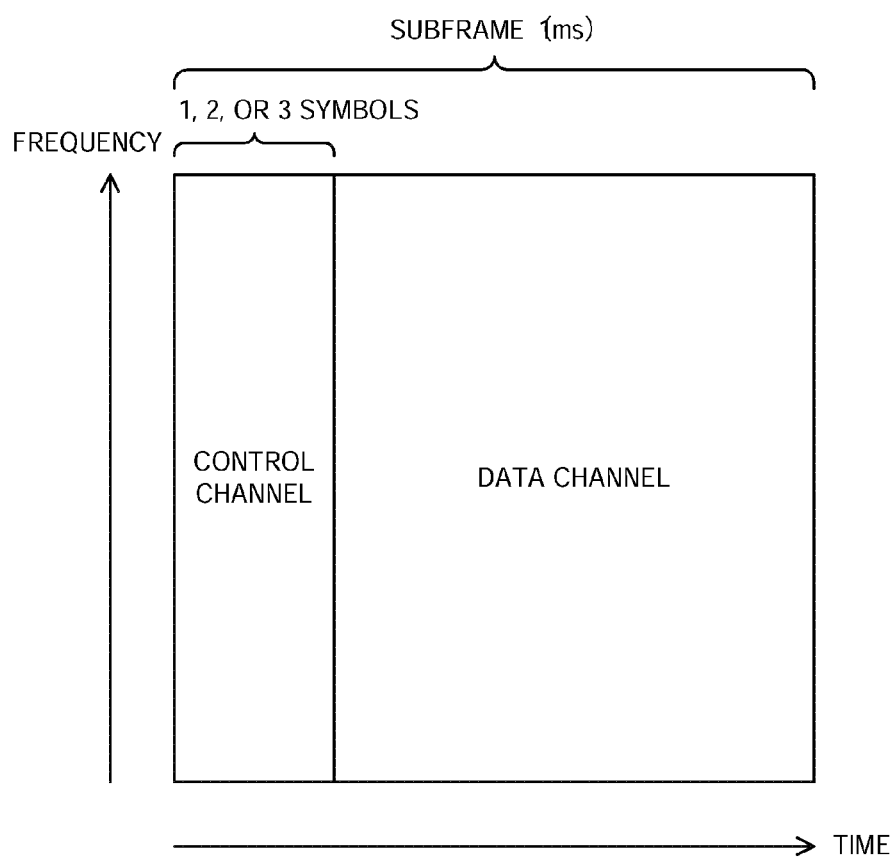
FIG. 20 illustrates a down channel of a radio frame.

FIG. 20 illustrates a down channel of a radio frame. In this example, OFDMA (Orthogonal Frequency Division Multiple Access) is used for downlink communication. With OFDMA a domain resource specified by a frequency axis and a time axis is subdivided to manage assignment. The smallest unit of a frequency domain is referred to as a subcarrier. The smallest unit of a time domain is referred to as a symbol. The smallest unit of a radio resource specified by (1 subcarrier)×(1 symbol) is referred to as a resource element.

A radio frame used for downlink communication from the base station 100 to the mobile station 200 or 200a includes a subframe like that illustrated in FIG. 20. The downlink subframe includes a control channel area and a data channel area. For example, determined symbol time (time corresponding to 1 symbol, 2 symbols, or 3 symbols, for example) from the head of the subframe is assigned as the control channel area and the remaining symbol time is assigned as the data channel area. User data the destinations of which are the mobile stations 200 and 200a is transmitted by the use of a data channel. Control information indicative of an area in which user data the destination of which is each mobile station is included and control information for specifying a MCS applied are transmitted by the use of a control channel.

Figure 21:
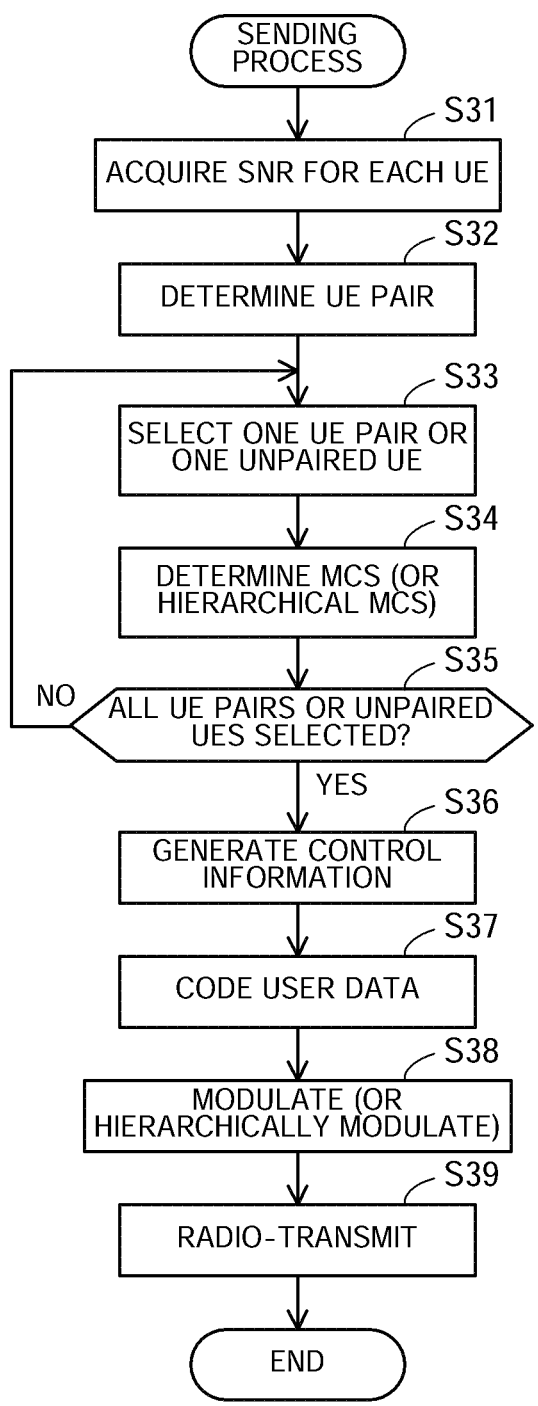
FIG. 21 is a flow chart of a sending process by the base station.

FIG. 21 is a flow chart of a sending process by the base station. This sending process is repeatedly performed by the base station 100. The process illustrated in FIG. 21 will now be described in order of step number.

(Step S31) The radio receiving section 103 receives CQIs corresponding to measured SNRs from the mobile stations 200 and 200a. The quality acquisition section 104 extracts the CQIs included in received signals. The control section 111 acquires the CQIs for the mobile stations 200 and 200a from the quality acquisition section 104.

(Step S32) The control section 111 determines mobile station pairs from user data destinations stored in the data buffer 105. The control section 111 may determine a mobile station pair by referring to the SNRs indicated by the CQIs acquired in step S31. In this example, it is assumed that the control section 111 determines the mobile stations 200 and 200a as a mobile station pair.

(Step S33) The control section 111 selects one mobile station pair determined in step S32 or one mobile station (for which hierarchical modulation is not performed) which is not included in the mobile station pairs determined in step S32.

(Step S34) The control section 111 refers to a hierarchical MCS table stored in the table storage section 110, and determines a MCS most suitable for a SNR for the mobile station selected in step S33. If the control section 111 selects a mobile station pair in step S33, then the control section 111 determines the most suitable hierarchical modulation method and a coding rate applied to each mobile station from two SNRs. In the case of the mobile station for which hierarchical modulation is not performed, the control section 111 may refer to an ordinary MCS table and determine the most suitable MCS.

(Step S35) The control section 111 determines whether all the mobile station pairs or all mobile stations which are not included in the mobile station pairs have been selected in step S33. If all the mobile station pairs or all the mobile stations which are not included in the mobile station pairs have been selected in step S33, then step S36 is performed. If not all the mobile station pairs or not all the mobile stations which are not included in the mobile station pairs have been selected in step S33, then step S33 is performed.

(Step S36) The control section 111 gives the control information generation section 107 instructions to generate control information. The control information generation section 107 generates control information indicative of the mobile station pairs determined in step S32 and the MCS determined in step S34.

(Step S37) The control section 111 designates coding rates for the coding section 106. The coding section 106 codes user data the destinations of which are mobile stations included in the mobile station pairs at the coding rates designated by the control section 111.

(Step S38) The control section 111 designates a modulation method. If the modulation method is a hierarchical modulation method, the control section 111 also designates a mobile station pair. The modulation section 108 modulates the user data coded in step S37 according to the modulation method designated by the control section 111. In addition, the modulation section 108 modulates the control information generated in step S36 according to a determined modulation method.

(Step S39) The radio sending section 109 transmits the control information modulated in step S38 by the use of a control channel and transmits the modulated user data by the use of a data channel. As a result, a signal including the user data and the control information is radio-outputted.

As has been described, the base station 100 determines a mobile station pair and determines a corresponding MCS from SNRs for the mobile stations paired. The base station 100 then codes and modulates user data the destinations of which are the mobile stations 200 and 200a according to a hierarchical modulation method and coding rates defined by the MCS, and transmits it. Generating the control information in step S36 and coding the user data in step S37 can be performed in parallel.

The base station 100 transmits control information for informing the mobile stations 200 and 200a of the MCS applied. There are various possible formats of the control information. Two examples of a format of the control information will now be given.

Figure 22:
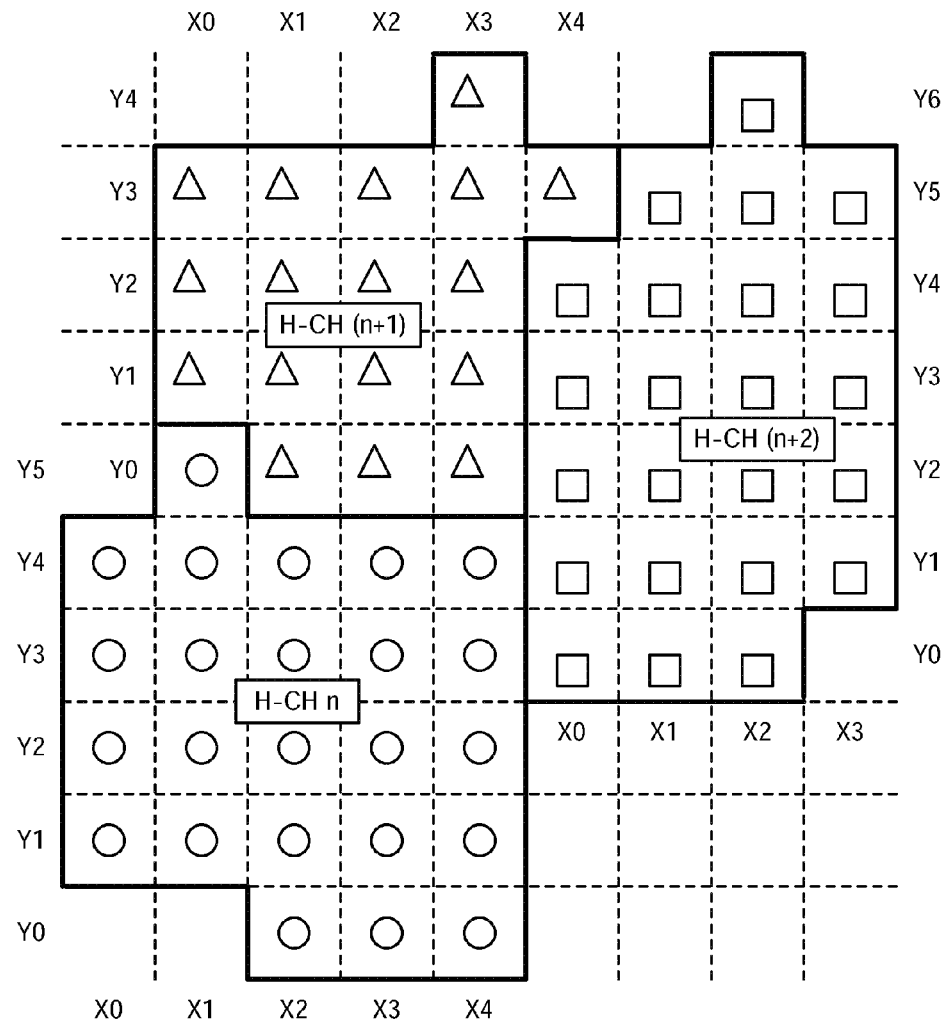
FIG. 22 illustrates a first example of a method for defining a MCS identification number.

FIG. 22 illustrates a first example of a method for defining a MCS identification number. With a first format unique X-direction and Y-direction identification numbers are defined for each hierarchical modulation method in order to identify each MCS. In the example of FIG. 22, the widths in the X and Y directions of an area of a hierarchical modulation method n (n is a nonnegative integer) are 5 and 6 respectively. Accordingly, identification numbers X0 through X4 are defined in the X-direction and identification numbers Y0 through Y5 are defined in the Y-direction. Similarly, the widths in the X and Y directions of an area of a hierarchical modulation method (n+1) are 5. Accordingly, identification numbers X0 through X4 are defined in the X-direction and identification numbers Y0 through Y4 are defined in the Y-direction. The widths in the X and Y directions of an area of a hierarchical modulation method (n+2) are 4 and 7 respectively. Accordingly, identification numbers X0 through X3 are defined in the X-direction and identification numbers Y0 through Y6 are defined in the Y-direction.

FIG. 23 illustrates a first example of control information for giving notice of a MCS identification number. With the first format the control information illustrated in FIG. 23 is transmitted to each mobile station pair by the use of a control channel. With the first format the control information includes a channel type for identifying a hierarchical modulation method, an identification number for UE0 (X-axis) in the hierarchically modulated channel, and an identification number for UE1 (Y-axis) in the hierarchically modulated channel.

One point in the hierarchical MCS table illustrated in FIG. 16 or 18 can be specified by these three pieces of information. However, there is no need for each of the mobile stations 200 and 200a to read all of the three pieces of information. The reason for this is that each of the mobile stations 200 and 200a can specify a hierarchical modulation method from the channel type and that each of the mobile stations 200 and 200a can specify a coding rate from the channel type and an identification number designated for it. That is to say, one of the mobile stations 200 and 200a determined as a pair can demodulate and decode user data the destination of which is it without reading an identification number designated for the other.

With the first format the amount (bit number) $N^1_{Total}$ of the control information corresponding to a mobile station pair can be defined as $$N^1_{Total} = \lceil \log_2 N_{H\text{-}CH} \rceil + \lceil \log_2 M_{x,max} \rceil + \lceil \log_2 M_{y,max} \rceil \qquad (9)$$

where $N_{H\text{-}CH}$ is the number of hierarchical modulation methods which appear in a hierarchical MCS table, $M_{x,max}$ is the maximum value of width in the X-direction, and $M_{y,max}$ is the maximum value of width in the Y-direction. The first, second, and third terms of the right side of equation (9) correspond to the amount of information for the channel type, the amount of information for the identification number for UE0, and the amount of information for the identification number for UE1 respectively.

Figure 24:
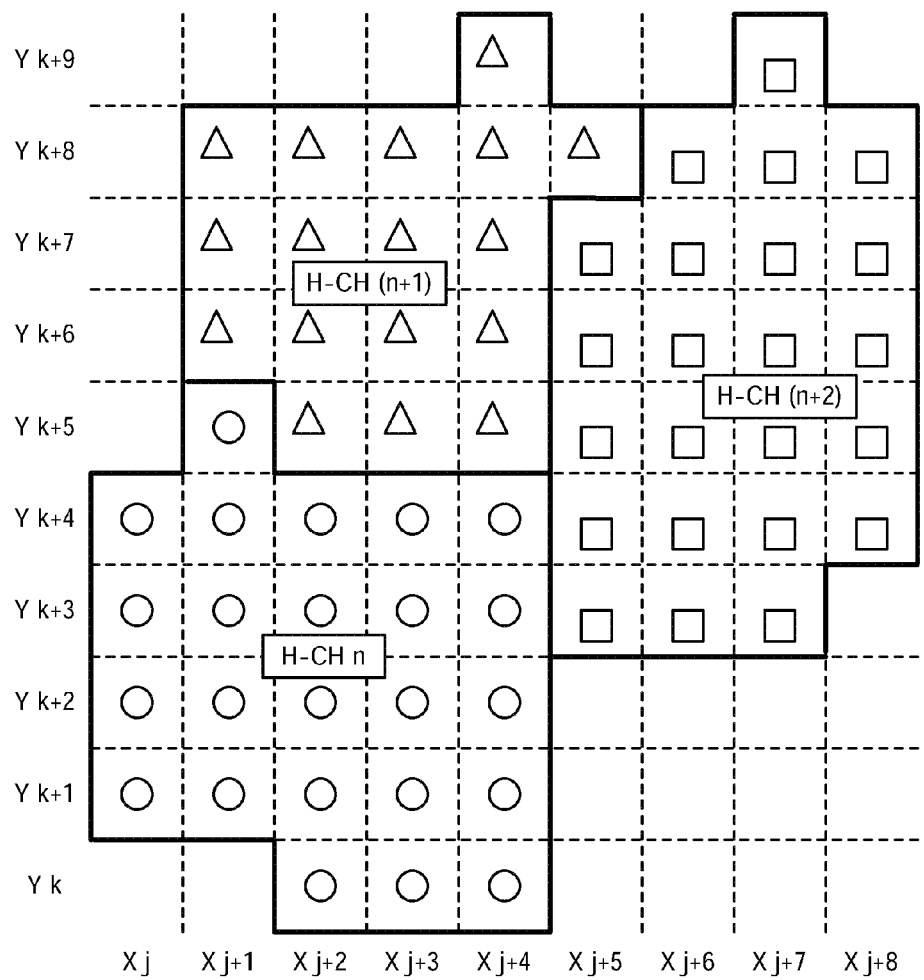
FIG. 24 illustrates a second example of a method for defining a MCS identification number.

FIG. 24 illustrates a second example of a method for defining a MCS identification number. With a second format unique X-direction and Y-direction identification numbers are defined in an entire hierarchical MCS table in order to identify each MCS. In the example of FIG. 24, an identification number Xj (j is a nonnegative integer) in the X-direction and an identification number Yk (k is a nonnegative integer) in the Y-direction are defined with the lower left-hand corner of the hierarchical MCS table as an origin.

Figure 25:
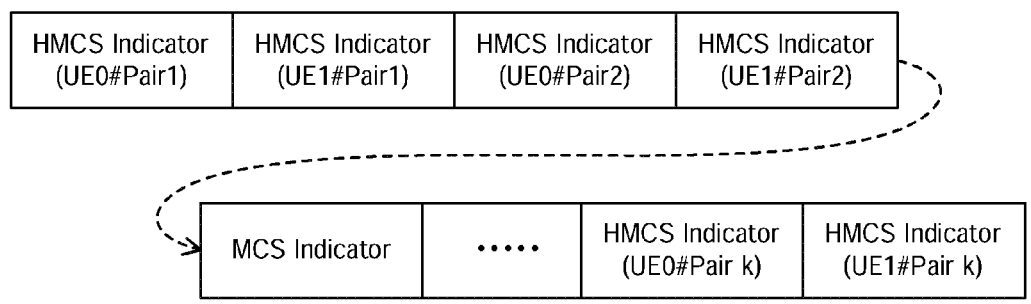
FIG. 25 illustrates a second example of control information for giving notice of a MCS identification number.

FIG. 25 illustrates a second example of control information for giving notice of a MCS identification number. With a second format, as illustrated in FIG. 25, control information including the contents of notice to be given to a plurality of mobile stations is transmitted by the use of a control channel. With the second format control information includes an identification number for UE0 (X-axis) and an identification number for UE1 (Y-axis). Identification numbers designated for two mobile stations paired are next to each other. Identification information indicative of a MCS for a mobile station for which hierarchical modulation is not performed (which is not paired with another mobile station) and the identification numbers may mingle in this control information.

A mobile station to which hierarchical modulation is applied can specify one point in the hierarchical MCS table illustrated in FIG. 16 or 18 by reading identification information designated for it and identification information adjacent thereto and designated for another mobile station it is paired with. It is assumed that each of the mobile stations 200 and 200a knows by another means (another piece of control information from the base station 100, for example) where identification information the destination of which is it is arranged. With the second format the amount (bit number) of control information can be reduced.

Figure 26:
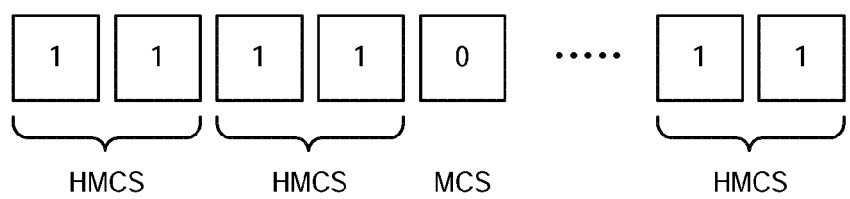
FIG. 26 illustrates an example of a bit map.

FIG. 26 illustrates an example of a bit map. This bit map is control information including the contents of notice to be given to a plurality of mobile stations, and is transmitted by the use of a control channel. The order of each bit (flag) in the bit map corresponds to the order of identification numbers in the control information illustrated in FIG. 25. A flag is set to "1" for a mobile station to which hierarchical modulation is applied, and a flag is set to "0" for a mobile station to which hierarchical modulation is not applied.

By referring to the bit map received via the control channel, one of the mobile stations 200 and 200a determined as a pair can rapidly determine whether user data the destination of which is it is hierarchically modulated, that is to say, whether to read an identification number designated for the other in addition to an identification number designated for it. If not only the control information illustrated in FIG. 25 but also the bit map is transmitted, the amount of the control information increases. In this case, the amount (bit number) $N^2_{Total}$ of the control information can be defined as $$N^2_{Total} = 2N_{H\text{-}UE} + N_{N\text{-}UE} \qquad (10)$$

where $N_{H-UE}$ is the number of mobile stations to which hierarchical modulation is applied, and $N_{N-UE}$ is the number of mobile stations to which hierarchical modulation is not applied.

Figure 27:
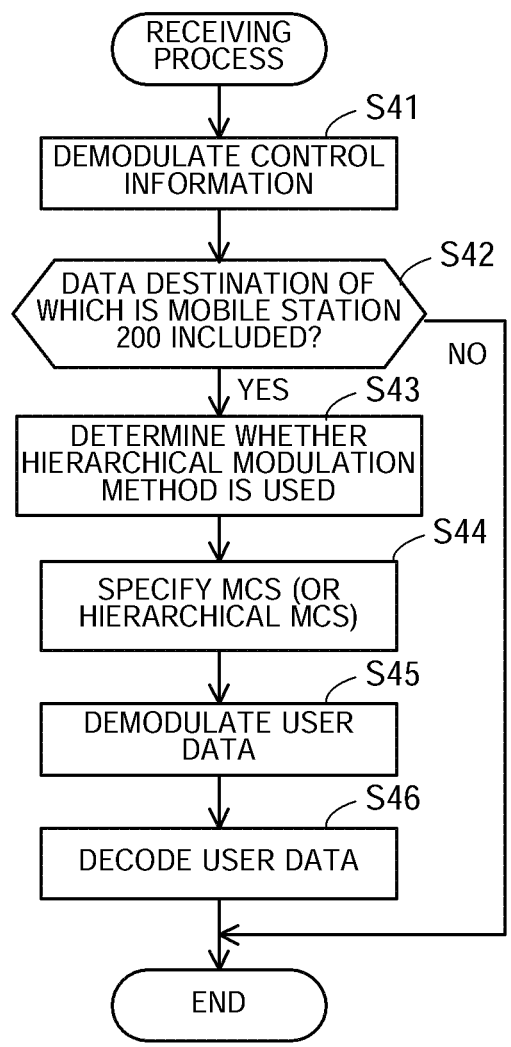
FIG. 27 is a flow chart of a receiving process by the mobile station.

FIG. 27 is a flow chart of a receiving process by the mobile station. This receiving process is repeatedly performed by the mobile station 200. The process illustrated in FIG. 27 will now be described in order of step number.

(Step S41) The radio receiving section 203 receives control information from the base station 100 via a control channel and receives user data from the base station 100 via a data channel. The demodulation section 204 demodulates the received control information.

(Step S42) On the basis of the received control information, the demodulation section 204 determines whether there is user data the destination of which is the mobile station 200. If there is user data the destination of which is the mobile station 200, then step S43 is performed. If there is no user data the destination of which is the mobile station 200, then the receiving process terminates.

(Step S43) The demodulation section 204 determines whether a hierarchical modulation method is used for modulating the user data. For example, if the above second format is used as a format of the control information, then whether a hierarchical modulation method is adopted can be determined on the basis of whether a flag for the mobile station 200 included in a bit map is set to "1".

(Step S44) The demodulation section 204 specifies a MCS applied to the user data. If hierarchical modulation is performed, then a method for specifying a hierarchical MCS depends on the format of the control information. For example, if the above first format is used, then a hierarchical MCS can be specified from a channel type and an identification number designated for the mobile station 200. If the above second format is used, then a hierarchical MCS can be specified from an identification number designated for the mobile station 200 and an identification number designated for a mobile station the mobile station 200 is paired with.

(Step S45) The demodulation section 204 demodulates the user data according to a modulation method indicated by the MCS (or the hierarchical MCS) specified in step S44. In the case of the hierarchical MCS, the demodulation section 204 demodulates a plurality of channels and extracts information bits corresponding to user data the destination of which is the mobile station 200.

(Step S46) The decoding section 205 decodes the user data demodulated in step S45 according to a coding rate indicated by the MCS specified in step S44.

As has been described, the mobile station 200 or 200a specifies a MCS applied to user data on the basis of control information received from the base station 100. The mobile station 200 or 200a then demodulates and decodes the user data according to a modulation method and a coding rate defined in the MCS. If a hierarchical modulation method in particular is applied, then the mobile station 200 or 200a demodulates a plurality of channels and extracts information bits corresponding to user data the destination of which is it.

By using the above mobile communication system, the most suitable hierarchical modulation method can be selected easily and a throughput in transmitting data to a plurality of mobile stations can be enhanced. In particular, a hierarchical modulation method is specified according to a communication quality for each of the mobile stations 200 and 200a paired. As a result, a more proper method is selected. In addition, the base station 100 can efficiently inform the mobile stations 200 and 200a of a hierarchical MCS and the amount of information in a control channel can be reduced.

In this embodiment two mobile stations are combined to perform hierarchical modulation. However, three or more mobile stations may be combined to perform hierarchical modulation. In this case, a hierarchical MCS table in three or more dimensions may be prepared. Furthermore, in this embodiment two data channels are used for performing hierarchical modulation. However, three or more data channels may be used for performing hierarchical modulation.

According to the above sending apparatus, receiving apparatus, sending method, and receiving method, data the destinations of which are a plurality of receiving apparatus can be transmitted efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A sending apparatus for transmitting data to a plurality of receiving apparatus, the sending apparatus comprising:
a storage section which stores information that associates first communication qualities and second communication qualities with hierarchical modulation methods each using a first channel and a second channel;
a control section which selects a hierarchical modulation method corresponding to a combination of one of the first communication qualities which corresponds to a communication quality for a first receiving apparatus and one of the second communication qualities which corresponds to a communication quality for a second receiving apparatus; and
a sending section which maps a part of first data whose destination is the first receiving apparatus and a part of second data whose destination is the second receiving apparatus to the first channel and maps another part of the first data and another part of the second data to the second channel according to the selected hierarchical modulation method, and transmits the first data and the second data by using the first channel and the second channel.

2. The sending apparatus according to claim 1, wherein:
first coding rates and second coding rates are also associated with the first communication qualities and the second communication qualities in the information stored in the storage section; and
the sending section codes the first data at one of the first coding rates and codes the second data at one of the second coding rates, the one of the first coding rates and the one of the second coding rates corresponding to the combination of the one of the first communication qualities and the one of the second communication qualities.

3. The sending apparatus according to claim 2, wherein the sending section also transmits control information including information identifying the hierarchical modulation method, information identifying the one of the first coding rates, and information identifying the one of the second coding rates.

4. The sending apparatus according to claim 1, wherein the sending section also transmits control information including first identification information corresponding to the communication quality for the first receiving apparatus and second identification information corresponding to the communication quality for the second receiving apparatus.

5. The sending apparatus according to claim 1, wherein the sending section also transmits control information including a flag indicative of whether the first data and the second data are transmitted by the use of a hierarchical modulation method.

6. The sending apparatus according to claim 1, wherein modulation methods other than the hierarchical modulation methods are associated with some of combinations of the first communication qualities and the second communication qualities in the information stored in the storage section.

7. The sending apparatus according to claim 6, wherein one of the modulation methods other than the hierarchical modulation methods is associated with a combination of a first communication quality and a second communication quality whose difference is smaller than or equal to a determined threshold.

8. The sending apparatus according to claim 6, wherein one of the modulation methods other than the hierarchical modulation methods is associated with a combination of a first communication quality and a second communication quality at least one of which is smaller than or equal to a determined threshold.

9. The sending apparatus according to claim 1, wherein:
a plurality of patterns each of which associates the first communication qualities and the second communication qualities with the hierarchical modulation methods are defined in the information stored in the storage section; and
the control section selects a pattern to be used from the plurality of patterns and selects a hierarchical modulation method on the basis of the pattern.

10. A receiving apparatus for receiving data from a sending apparatus which communicates with a plurality of receiving apparatus, the receiving apparatus comprising:
a storage section which stores information that associates first communication qualities and second communication qualities with hierarchical modulation methods each using a first channel and a second channel; and
a receiving section which receives from the sending apparatus control information including first identification information indicating one of the first communication qualities which corresponds to a communication quality for the receiving apparatus and second identification information indicating one of the second communication qualities which corresponds to a communication quality for another receiving apparatus, receives from the sending apparatus the first channel which includes a part of first data whose destination is the receiving apparatus and a part of second data whose destination is said another receiving apparatus, receives from the sending apparatus the second channel which includes another part of the first data and another part of the second data, and extracts the part of the first data from the first channel and said another part of the first data from the second channel according to a hierarchical modulation method specified by a combination of the first identification information and the second identification information.

11. A sending method by a sending apparatus for transmitting data to a plurality of receiving apparatus, the method comprising:
selecting, on the basis of determined information which associates first communication qualities and second communication qualities with hierarchical modulation methods each using a first channel and a second channel, a hierarchical modulation method corresponding to a combination of one of the first communication qualities which corresponds to a communication quality for a first receiving apparatus and one of the second communication qualities which corresponds to a communication quality for a second receiving apparatus; and
mapping a part of first data whose destination is the first receiving apparatus and a part of second data whose destination is the second receiving apparatus to the first channel and mapping another part of the first data and another part of the second data to the second channel according to the hierarchical modulation method selected, and transmitting the first data and the second data by using the first channel and the second channel.

12. A receiving method by a receiving apparatus for receiving data from a sending apparatus which communicates with a plurality of receiving apparatus, the method comprising:
receiving from the sending apparatus control information including first identification information indicating one of first communication qualities which corresponds to a communication quality for the receiving apparatus and second identification information indicating one of second communication qualities which corresponds to a communication quality for another receiving apparatus;
specifying a hierarchical modulation method corresponding to a combination of the first identification information and the second identification information on the basis of determined information which associates the first communication qualities and the second communication qualities with hierarchical modulation methods each using a first channel and a second channel;
receiving from the sending apparatus the first channel which includes a part of first data whose destination is the receiving apparatus and a part of second data whose destination is said another receiving apparatus, and receiving from the sending apparatus the second channel which includes another part of the first data and another part of the second data; and
extracting the part of the first data from the first channel and said another part of the first data from the second channel according to the specified hierarchical modulation method.

13. The receiving method according to claim 12, wherein:
the determined information associates N sets of communication qualities including the first communication qualities and the second communication qualities with the hierarchical modulation methods, where N is an integer greater than or equal to two; and
the hierarchical modulation method is specified on the basis of the control information including N pieces of identification information including the first identification information and the second identification information.

* * * * *